United States Patent
Brown et al.

(10) Patent No.: US 10,983,995 B2
(45) Date of Patent: Apr. 20, 2021

(54) INFORMATION RETRIEVAL USING AUTOMATA

(71) Applicant: Crowdstrike, Inc., Irvine, CA (US)

(72) Inventors: Daniel W. Brown, Beverly, MA (US); David F. Diehl, Minneapolis, MN (US)

(73) Assignee: Crowdstrike, Inc., Irvine, CA (US)

( * ) Notice: Subject to any disclaimer, the term of this patent is extended or adjusted under 35 U.S.C. 154(b) by 351 days.

(21) Appl. No.: 15/624,193

(22) Filed: Jun. 15, 2017

(65) Prior Publication Data
US 2018/0365289 A1     Dec. 20, 2018

(51) Int. Cl.
| G06F 16/2453 | (2019.01) |
| G06F 16/901 | (2019.01) |
| G06F 16/903 | (2019.01) |
| G06F 21/56 | (2013.01) |
| G06F 21/55 | (2013.01) |
| H04L 29/06 | (2006.01) |

(52) U.S. Cl.
CPC .... G06F 16/24535 (2019.01); G06F 16/9024 (2019.01); G06F 16/90335 (2019.01); G06F 16/90344 (2019.01); G06F 21/55 (2013.01); G06F 21/56 (2013.01); H04L 63/145 (2013.01)

(58) Field of Classification Search
CPC ............... G06F 16/24535; G06F 16/90335
See application file for complete search history.

(56) References Cited

U.S. PATENT DOCUMENTS

| 6,052,686 A | 4/2000 | Fernandez et al. |
| 7,539,032 B2 * | 5/2009 | Ichiriu ............... G06F 16/90344 365/49.17 |
| 2015/0161266 A1 | 6/2015 | Conradt et al. |
| 2015/0379158 A1 * | 12/2015 | Infante-Lopez .... G06F 16/9024 707/798 |

(Continued)

FOREIGN PATENT DOCUMENTS

| EP | 2854094 | 4/2015 |
| EP | 3416068 A2 | 12/2018 |

OTHER PUBLICATIONS

The Partial European Search Report dated Oct. 15, 2018, for PCT Application No. 18174343.6, 5 pages.

(Continued)

Primary Examiner — Hau H Hoang
(74) Attorney, Agent, or Firm — Lee & Hayes, P.C.

(57) ABSTRACT

Example techniques herein search a graph data structure and retrieve data associated with a result node or edge. The graph can include nodes representing, e.g., processes or files, and edges between the nodes. A control unit can produce a discrete finite automaton (DFA) based on a query. The control unit can traverse the DFA in conjunction with the graph, beginning at an initial state of the DFA and an entry-point node of the graph, to reach a result node of the graph associated with a triggering state of the DFA. Traversal can include unwinding upon reaching a terminal state of the DFA, in some examples. The control unit can retrieve data associated with the result node or an edge connected there to, and can provide the data via a communications interface. A data-retrieval system can communicate with a data-storage system via the communications interface, in some examples.

19 Claims, 10 Drawing Sheets

(56) References Cited

U.S. PATENT DOCUMENTS

2017/0255692 A1* 9/2017 Lei .................. G06F 17/2836
2018/0367557 A1 12/2018 Brown et al.

OTHER PUBLICATIONS

Sawwart, et. al., "Horton: Online Query Execution Engine for Large Distributed Graphs", 28th International Conference on Data Engineering, Apr. 2012, IEEE, pp. 1289-1292.
Elnikety, "Horton: Online Query Execution Engine on Large Distributed Graphs", retrieved on Oct. 4, 2018 at <<https:jjwww.cse.unsw.edu.auj-iwgdm/2011/SlidesjSameh.pdf>>, Dec. 31, 2011, pp. 24-26.
The Extended European Search Report dated Jan. 21, 2019 for European Patent Application No. 18174343.6, 13 pages.
"A Gentle Introduction to XPath", Altova, retrieved Mar. 12, 2018 from <<https:www.altova.com/mobiletogether/xpath-intro>>, 17 pages.
Cox, R., "Regular Expression Matching Can Be Simple and Fast", Jan. 2007, retrieved from <<https://swtch.com/~rsc/regexp/regexp1.html<<, 18 pages.
Fegaras, Converting a Regular Expression into a Deterministic Finite Automaton, retrieved on Apr. 26, 2017 from <<https://lambda.uta.edu/cse5317/spring01/notes/node9.html>>, 4 pages.
Gremlin (programming language) , Wikipedia, retrieved Mar. 12, 2018, from https en.wikipedia.org wiki Gremlin_(programming_language) , 6 pages.
"Prolog Cuts and Negation" Wikibooks, Jan. 23, 2016, retrieved Apr. 26, 2017, from https://en.wikibooks.org/w/index.php?title=Prolog/Cuts_and_Negation&oldid=3040292, 4 pages.
Extended European Search Report from European Patent Office for Application No. 19173702.2, dated Oct. 9, 2019, a counterpart foreign application of U.S. Appl. No. 15/979,903, 13 pages.
Office Action for U.S. Appl. No. 15/979,903, dated May 7, 2020, Brown, "Data-Graph Information Retrieval Using Automata", 10 pages.
Abul-Basher, et al., "Tasweet: Optimizing Disjunctive Regular Path Queries in Graph Databases", 20th International Conference on Extending Database Technology, Venice, Italy, Mar. 21-24, 2017, pp. 470-473.
Office Action for U.S. Appl. No. 15/979,903, dated Sep. 3, 2020, Brown, "Data-Graph Information Retrieval Using Automata", 10 pages.
Blackbum, et al., "Learn Prolog Now!: 2.2 Proof Search", retrieved Mary 7, 2018 from <<http://www.learnprolognow.org/lpnpage.php?pagetype=html&pageid=lpn-htmlse6>>, published 2006-2012, 5 pages.
Blackbum, et al., "Learn Prolog Now!: 10.1 The Cut", retrieved May 7, 2018 from <<http://www.learnprolognow.org/lpnpage.php?pagetype=html&pageid=lpn-htmlse43>>, published 2006-2012, 5 pages.

* cited by examiner

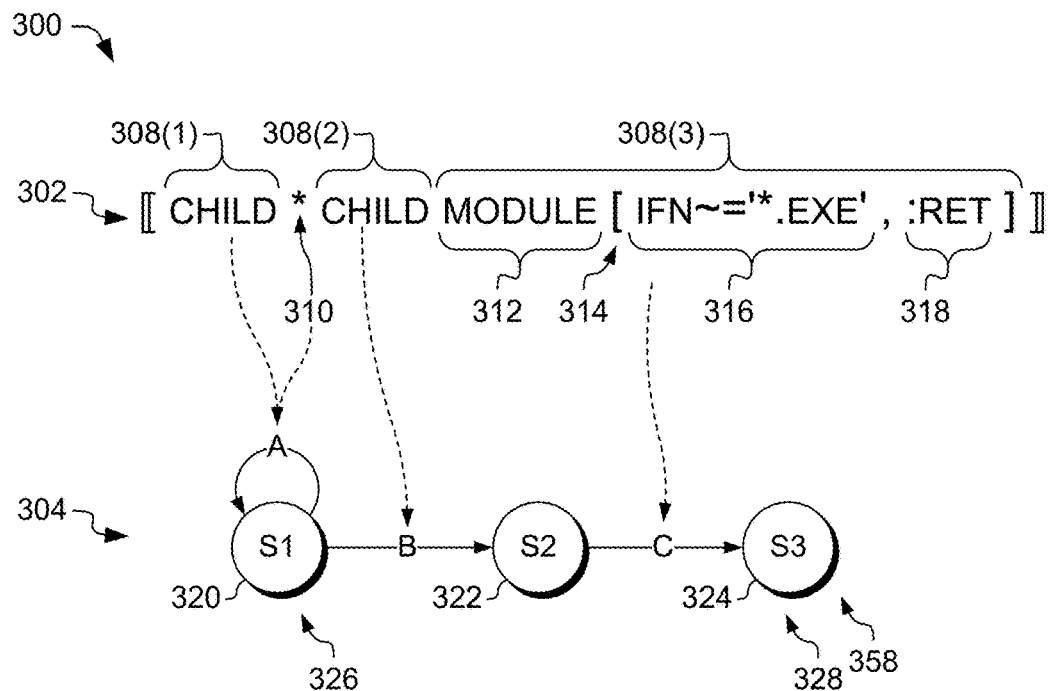
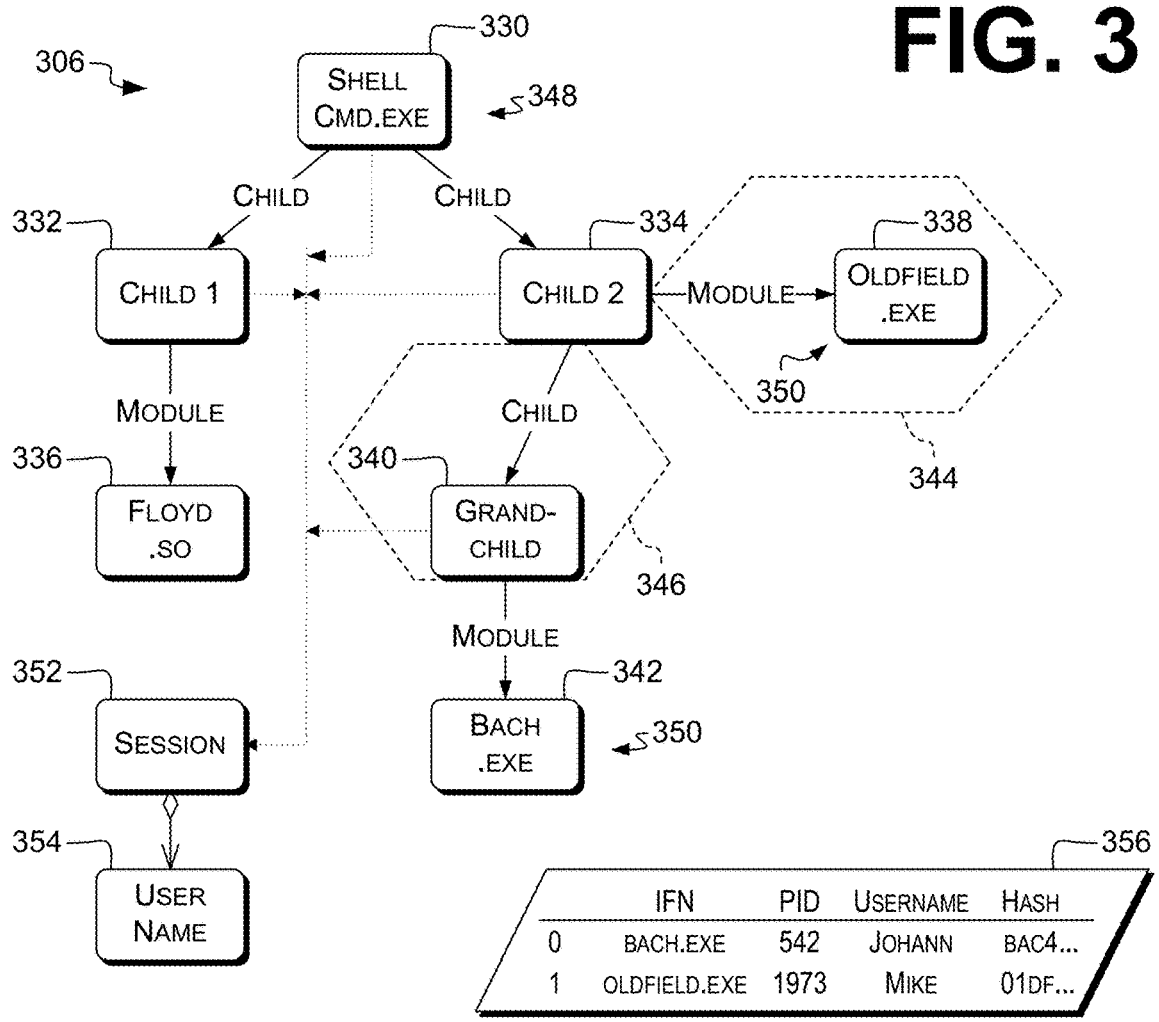
FIG. 3

INFORMATION RETRIEVAL USING AUTOMATA

BACKGROUND

With computer and Internet use forming an ever greater part of day to day life, security exploits and cyber attacks directed to stealing and destroying computer resources, data, and private information are becoming an increasing problem. "Malware", or malicious software, is a general term used to refer to a variety of forms of hostile or intrusive computer programs. Malware is used, for example, by cyber attackers to disrupt computer operations, to access and to steal sensitive information stored on the computer or provided to the computer by a user, or to perform other actions that are harmful to the computer and/or to the user of the computer. Malware may include computer viruses, worms, Trojan horses, ransomware, rootkits, keyloggers, spyware, adware, rogue security software, potentially unwanted programs (PUPs), potentially unwanted applications (PUAs), and other malicious programs. Malware may be formatted as executable files (e.g., COM or EXE files), dynamic link libraries (DLLs), scripts, steganographic encodings within media files such as images, and/or other types of computer programs, or combinations thereof.

Modern computers may have hundreds of processes active at any given time, and may store tens or hundreds of thousands of files. Locating malicious processes or files within such a broad scope can be very time-consuming and resource-intensive.

BRIEF DESCRIPTION OF THE DRAWINGS

The detailed description is described with reference to the accompanying figures. In the figures, the left-most digit (s) of a reference number identifies the figure in which the reference number first appears. The use of the same reference numbers in different figures indicates similar or identical items or features. For brevity of illustration, in the diagrams herein, an arrow beginning with a diamond connects a first component or operation (at the diamond end) to at least one second component or operation that is or can be included in the first component or operation in at least one example.

FIG. 3 illustrates an example query, a discrete finite automaton (DFA) corresponding to the example query, and an example graph to which the query can be applied.

DETAILED DESCRIPTION

Overview

Figure 1:
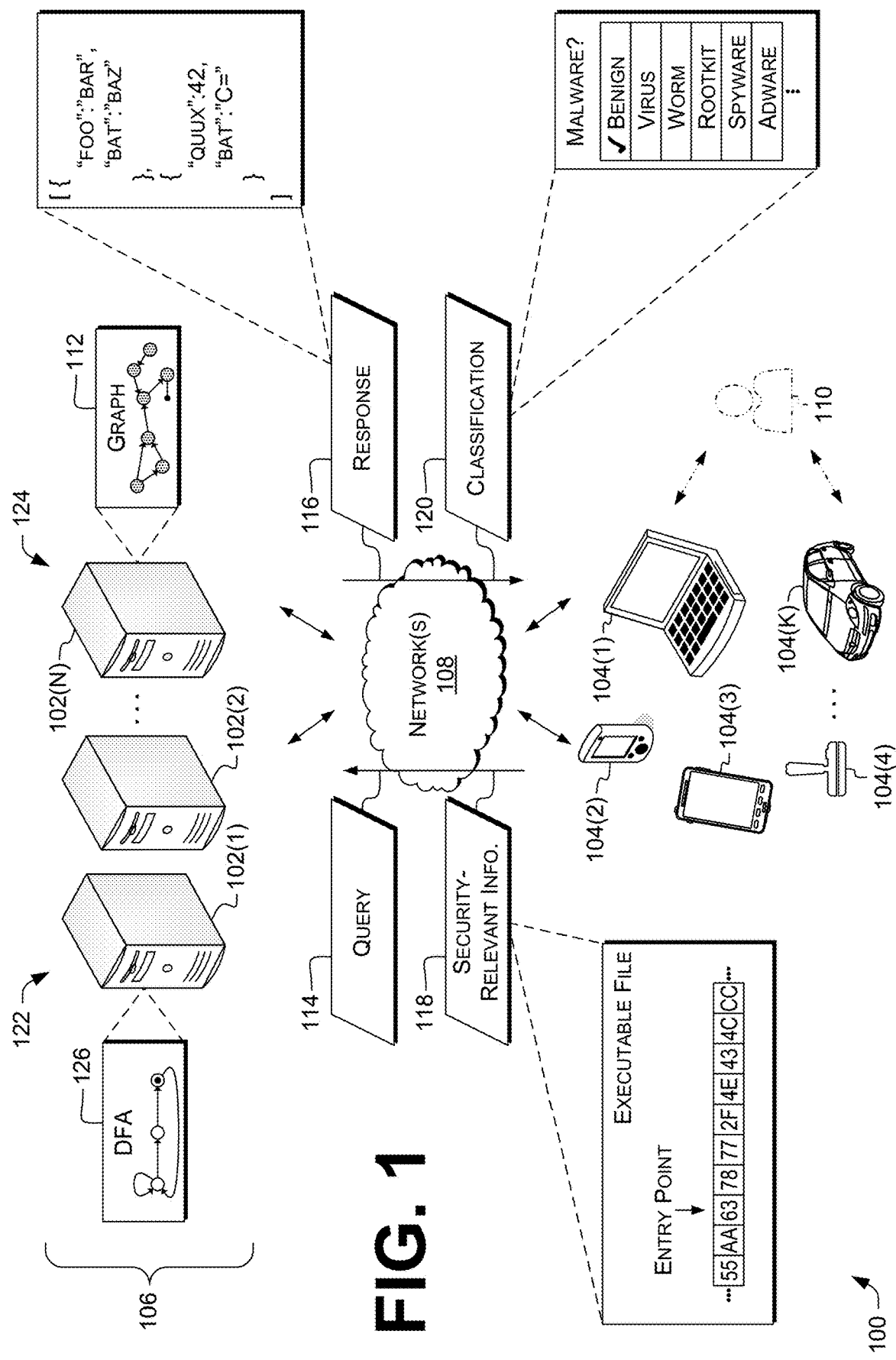
FIG. 1 is a block diagram depicting example scenarios for determining and searching graph data structures as described herein.

Some examples herein relate to detection or classification of malware, e.g., malicious processes executing on a computer. Classifications can include, e.g., malware vs. non-malware, or what type of malware. Some examples relate to querying a graph data structure ("graph") storing security-relevant information, e.g., parent-child relationships among processes or files (or other data streams, and likewise throughout this discussion). More effectively querying such data structures can permit more readily identifying malware or possible malware, which can in turn permit terminating malicious processes in order to limit the damage they can do. Queries can be specified in a variety of query languages ("QLs" for brevity). Throughout this document, the notation "⟦ text ⟧" (in double-struck brackets) refers to the query "text" expressed in a QL such as QLs described herein. The text enclosed in such brackets may be a full QL query or a portion thereof. The particular QL syntax shown herein is not limiting, and other QLs according to examples herein can be defined that use more, fewer, or different operators or other syntactic elements.

Throughout this document, array and record access follows C/Pascal syntax: array[index]; record.field. Regular expressions ("regexes") are delimited by forward slashes ("//").

In various embodiments, one or more monitored devices may each be equipped with a security agent (e.g., a service or daemon process) to monitor events on those respective one or more computing devices. Those monitored computing devices may be in communication with devices of a security service cloud. The security service cloud may be also be configured to monitor events on those monitored computing devices. The computing devices or the cloud may maintain data objects representative of system events (e.g., new process; write file) or system components associated with those events (e.g., files, processes, credentials) in a graph. The graph can include nodes representing the system components, and edges representing system events or relationships between those components introduced by system events. Example system components can include data streams. Data streams can include data stored in, e.g., a file, a disk boot sector or partition root sector, or a block of memory.

However, the number of processes and files running on a modern computer system is large and growing. Moreover, the number of events per second increases as the speed and capability of a computing device increase. Searching through graphs to locate patterns associated with suspect or malicious activity can be computationally infeasible. For example, a brute-force graph search can have exponential time complexity.

Some examples herein can permit more effectively searching graphs for simple or complex patterns of relationships and node or edge properties. In some examples, the search begins at a pre-specified entry-point node. This significantly reduces the time required to perform the search compared to techniques that seek patterns without limitation to the nodes included in those patterns. Some examples herein permit specifying patterns to be sought in the graph using a compact, expressive QL. This can increase the flexibility of the search system compared to prior schemes using, e.g., fixed text fields to receive values to be sought in particular portions of records.

Example techniques described herein may refer to processes and modules running on a computing device, e.g., in the context of analyzing a program that is known to be, or may potentially be, malware. However, the techniques may also apply to other non-malicious software, processes, or other system components. For example, techniques described herein can be used in determining which processes are accessing particular files or other system resources, or in analyzing causes of excess resource usage by processes. Accordingly, techniques discussed herein for searching graphs may be used by, among others, anti-malware security researchers, white-hat vulnerability researchers, interoperability developers, anti-piracy testers, or other analysts of data streams.

Various entities, configurations of electronic devices, and methods for retrieving data from a graph, e.g., for stream-analysis or malware-detection applications, are described herein. While many examples described herein relate to servers and other non-consumer electronic devices, other types of electronic devices can be used, e.g., as discussed with reference to FIG. 1. References throughout this document to "users" can refer to human users or to other entities interacting with a computing system.

Illustrative Environments

FIG. 1 shows an example scenario 100 in which examples of data-retrieval systems can operate or in which data-retrieval methods such as those described herein can be performed. Illustrated devices and/or components of scenario 100 include computing device (s) 102 (1)-102 (N) (individually and/or collectively referred to herein with reference 102), where N is any integer greater than and/or equal to 1, and computing devices 104 (1)-104 (K) (individually and/or collectively referred to herein with reference 104), where K is any integer greater than and/or equal to 1. In some examples, N=K; in other examples, N<K or N>K. Although illustrated as, e.g., desktop computers, laptop computers, tablet computers, and/or cellular phones, computing device (s) 102 and/or 104 can include a diverse variety of device categories, classes, and/or types and are not limited to a particular type of device.

In the illustrated example, computing device (s) 102 (1)-102 (N) can be computing nodes in a cluster computing system 106, e.g., a cloud service such as GOOGLE CLOUD PLATFORM or another cluster computing system ("computing cluster" or "cluster") having several discrete computing nodes (device (s) 102) that work together to accomplish a computing task assigned to the cluster as a whole. In some examples, computing device (s) 104 can be clients of cluster 106 and can submit computing tasks to cluster 106 and/or receive task results from cluster 106. Computing devices 102 (1)-102 (N) in cluster 106 can, e.g., share resources, balance load, increase performance, and/or provide fail-over support and/or redundancy. Computing devices 104 can additionally or alternatively operate in a cluster and/or grouped configuration. In the illustrated example, computing devices 104 communicate with computing devices 102. Additionally or alternatively, computing devices 104 can communicate with cluster 106, e.g., with a load-balancing or task-coordination device of cluster 106, and cluster 106 or components thereof can route transmissions to individual computing devices 102.

Some cluster-based systems can have all or a portion of the cluster deployed in the cloud. Cloud computing allows for computing resources to be provided as services rather than a deliverable product. For example, in a cloud-computing environment, resources such as computing power, software, information, and/or network connectivity are provided (for example, through a rental agreement) over a network, such as the Internet. As used herein, the term "computing" used with reference to computing clusters, nodes, and tasks refers generally to computation, data manipulation, and/or other programmatically-controlled operations. The term "resource" used with reference to clusters, nodes, and tasks refers generally to any commodity and/or service provided by the cluster for use by tasks. Resources can include processor cycles, disk space, random-access memory (RAM) space, network bandwidth (uplink, downlink, or both), prioritized network channels such as those used for communications with quality-of-service (QoS) guarantees, backup tape space and/or mounting/un-mounting services, electrical power, etc. Cloud resources can be provided for internal use within an organization or for sale to outside customers. In some examples, computer security service providers can operate cluster 106, or can operate or subscribe to a cloud service providing computing resources.

In other examples, cluster 106 or computing device (s) 102 can be deployed as a computing appliance operated by or on behalf of a particular user, group, or organization. For example, a corporation may deploy an appliance per office site, per division, or for the company as a whole. In some examples, the computing appliance can be a central, single-tenant, on-premises appliance. In some examples, a computing appliance can be used to implement at least one of the computing device (s) 102 in addition to, or instead of, a cloud service.

In some examples, as indicated, computing device (s), e.g., computing devices 102 (1) and 104 (1), can intercommunicate to participate in and/or carry out data retrieval as described herein. For example, computing device 104 (1) can be or include a user interface owned or operated by or on behalf of a user and configured to receive queries from the user and present results to the user, and computing device 102 (1) can be or include a data-retrieval system, as described below.

Different devices and/or types of computing devices 102 and 104 can have different needs and/or ways of interacting with cluster 106. For example, computing devices 104 can interact with cluster 106 with discrete request/response communications, e.g., for queries and responses using an already-determined graph. Additionally and/or alternatively, computing devices 104 can be data sources (e.g., running security agents) and can interact with cluster 106 with discrete and/or ongoing transmissions of data to be used as input to a graph or a process of determining a graph. For example, a data source in a personal computing device 104 (1) can provide to cluster 106 data of newly-installed executable files, e.g., after installation and before execution of those files. This can provide improved accuracy of outputs of a computational model (CM), e.g., a malware-detection CM, by increasing the amount of data input to the CM. In some examples, the malware-detection CM can analyze data from a graph to evaluate whether a newly-installed file is malware. CMs can include, e.g., neural networks, boosted trees, or other machine-learning models.

In some examples, computing devices 102 and/or 104 can communicate with each other and/or with other computing devices via one or more network (s) 108. In some examples, computing devices 102 and 104 can communicate with external devices via network (s) 108. For example, network (s) 108 can include public networks such as the Internet, private networks such as an institutional and/or personal intranet, and/or combination (s) of private and public networks. Communications between computing devices 102 and/or 104 via network (s) 108 can be structured, e.g., according to defined application programming interfaces (APIs). For example, data can be retrieved via network (s) 108, e.g., using a Hypertext Transfer Protocol (HTTP) request such as a GET to a Web Services and/or Representational State Transfer (REST) API endpoint. Data can be returned in formats including, but not limited to, Extensible Markup Language (XML); JavaScript Object Notation (JSON); Hypertext Markup Language (HTML); spreadsheet formats such as Comma-Separated Value (CSV); archive formats such as gzip; or others. Remote Procedure Call (RPC) APIs such as OSF DCE RPC or D-Bus or other types of APIs can additionally or alternatively be used for network communications.

In some examples, computing devices 102 and/or 104, e.g., laptops, smartphones, and/or other computing devices 102 and/or 104 described herein, interact with an entity 110 (shown in phantom). The entity 110 can include systems, devices, parties such as users, and/or other features with which computing devices 102 and/or 104 can interact. For brevity, examples of entity 110 are discussed herein with reference to users of a computing system; however, these examples are not limiting. In some examples, computing device 104 is operated by entity 110, e.g., a user. In some examples, computing devices 102 retrieve data from a graph, e.g., using a search beginning at a node corresponding to a file or other system component on a user's computing device 104. In some examples, computing devices 102 transmit an indication of the search results, e.g., a JSON array of hashes, via network 108 to the computing device 104, e.g., a smartphone or desktop computer. The computing device 104 can, e.g., present information of the search results to entity 110. Examples of search processes are discussed in more detail below with reference to at least FIGS. 4-7.

Computing device (s) 102 can store one or more graph data structures (graphs) 112, individually and/or collectively referred to herein with reference 112. A graph can include one or more nodes and one or more edges connecting at least some of the nodes. Some example nodes (circles) and edges (lines) are depicted in graph 112 on FIG. 1. Graph 112 can include at least one undirected edge or at least one directed edge. In some examples, e.g., as depicted, graph 112 is a directed graph. In some examples, graph 112 includes at least one cycle, i.e., a path along edges that leads from a first node via at least one second node back to the first node.

In some examples, algorithms for determining or searching graph (s) 112 as described herein can be performed on a computing device (e.g., computing device 102), such as a smart phone, a tablet, a desktop computer, a server, a server blade, a supercomputer, etc. Search results can be presented on such computing devices and/or on computing devices (e.g., computing device 104) having one or more input devices, such as a physical keyboard, a soft keyboard, a touch screen, a touch pad, microphone (s), and/or camera (s). In some examples, functions described herein can be shared between one or more computing device (s) 102 and one or more computing device (s) 104. For example, the searching of graph 112 can be performed by computing device (s) 102 alone, by computing device (s) 104 alone, or by computing device (s) 102 and 104 in a coordinated manner.

The computing device (s) 102 can be configured to use results from queries of graph 112 to, e.g., categorize a file with respect to malware type, and/or to perform other data analysis and/or processing. In some examples, the computing device 104 can be configured to communicate with computing device (s) 102 to query a graph 112. For example, the computing device 104 can transmit a query 114 to computing device (s) 102. Computing device (s) 102 can retrieve data from the graph 112 based on the query 114 and transmit the data as a response 116 to the computing device 104. The computing device 104 can receive the response 116 and take action based on that response. In some examples, the computing device 104 can provide to entity 110 information included in the response 116, or can quarantine or delete file (s) indicated in the response 116 as being associated with malware.

In the illustrated example, computing device (s) 104 can also provide security-relevant information (SRI) 118 to computing device (s) 102, e.g., for incorporation into graph 112. The SRI 118 can include, e.g., data streams (or portions thereof, and likewise throughout this document); system events; or identification or contents of system components associated with events. In the illustrated example, the SRI 118 includes data of an executable file ("EXE"), e.g., a WINDOWS Portable Executable (PE)-format file. The specific illustrated form and contents of the executable file are provided for clarity of explanation, and are not limiting. Shown are machine-code bytes around an entry point of the executable, in one example. Computing device (s) 102 can update or modify graph 112 to include the SRI 118 or representation (s) thereof. The computing device (s) 102 can provide to computing device (s) 104 a response 116, a classification 120, or other information determined by searching graph 112.

In some examples, computing device (s) 104 can communicate with a data-retrieval system 122, e.g., computing device 102 (1). Data-retrieval system 122 can communicate with a data-storage system 24, e.g., computing device 102 (N), e.g., via a communications interface (e.g., communications interface 232, FIG. 2). For example, data-retrieval system 122 can comprise an HTTP, Gopher, or other server configured to interface with computing device (s) 104 or user-interface software or hardware thereof. Data-storage system 124 can comprise a database, e.g., a NoSQL database such as APACHE CASSANDRA or a graph database such as NEO4J, holding graph 112. In some examples, data-storage system 124 can provide a RESTful, Web Services, ODBC/JDBC, or other interface via which data-retrieval system 122 can request information of or about nodes or edges in graph 112. In an example RESTful interface, queries "GET /node/name/field" and "GET /edge/name/field" can be used to retrieve the value of field field from node or edge name (respectively).

In some examples, data-retrieval system 122 or other systems described herein can traverse a discrete finite automaton (DFA) 126 in conjunction with the graph 112 in order to retrieve information. As shown, the DFA includes states (circles) connected by transitions (lines and arcs). At least one state can be a triggering state (depicted as a bull's-eye), as discussed below with reference to at least FIGS. 3 and 4. In the illustrated example, DFA 126 is stored at data-retrieval system 122 (e.g., a Web server), and graph 112 is stored at data-storage system 124 (e.g., a backend database server). In other examples, both graph 112 and DFA 126 are stored at a common group of computing device (s) 102.

In the illustrated example, the response 116 includes a compound data structure, expressed in JSON notation for clarity of explanation. The illustrated response is a vector of two objects, each having two fields. Each field is associated with a single value. Values can be strings, as shown, characters, numerical values, arrays, records, or values of other types. Numerical values can be real numbers, fractions, integers, imaginary numbers, complex numbers, or other numerical values. Objects can have fields of different types; in the illustrated example, response[1].quux has the numerical value 42 and response[1].bat has the string value "C=". Objects can have fields in common with other objects (e.g., bat in both response[0] and response[1]) or fields not in common (e.g., response[0].foo or response[1].quux, neither of which is found in the other member of response). Examples of fields can include, but are not limited to, filenames, filehandles, userids, groupids, process identifiers, session identifiers (e.g., process command lines, universally unique identifiers (UUIDs), permissions, access-control lists (ACLs), timestamps, blocks of data (e.g., headers or full contents of files or of regions of memory), counts (e.g., of VIRUSTOTAL positives), In the illustrated example, the classification 120 includes a bitmask, attribute list, or other representation of categories to which a particular system component belongs, as determined by searching graph 112. For example, classification 120 can include a Boolean value indicating whether or not the system component is associated with malware, or an enumerated value indicating with which of several categories the system component is associated (e.g., "benign," "virus," or "spyware"). Classification 120 can additionally or alternatively include one or more confidence values or other values indicating the likelihood of a classification, e.g., a "spyware" value of 0.42 indicating a 42% likelihood that the sample is spyware. In an example, classification 120 can include multiple confidence values for respective categories of malware (e.g., "spyware=0.42; worm=0.05"). In some examples, response 116 or classification 120 can be used by a security analyst in triaging or analyzing data streams, and can permit the security analyst to separate data streams based on a likelihood they are in fact malware or associated with malware (e.g., commonly used by malware authors).

By way of example and not limitation, computing device (s) 102 and/or 104 can include, but are not limited to, server computers and/or blade servers such as Web servers, map/reduce servers and/or other computation engines, and/or network-attached-storage units (e.g., 102 (1)), laptop computers, thin clients, terminals, and/or other mobile computers (e.g., 104 (1)), wearable computers such as smart watches and/or biometric and/or medical sensors, implanted computing devices such as biometric and/or medical sensors, computer navigation client computing devices, satellite-based navigation system devices including global positioning system (GPS) devices and/or other satellite-based navigation system devices, personal data assistants (PDAs), and/or other specialized portable electronic devices (e.g., 104 (2)), tablet computers, tablet hybrid computers, smartphones, mobile phones, mobile phone-tablet hybrid devices, and/or other telecommunication devices (e.g., 104 (3)), portable and/or console-based gaming devices and/or other entertainment devices such as network-enabled televisions, set-top boxes, media players, cameras, and/or personal video recorders (PVRs) (e.g., 104 (4), depicted as a joystick), automotive computers such as vehicle control systems, vehicle security systems, and/or electronic keys for vehicles (e.g., 104(K), depicted as an automobile), desktop computers, and/or integrated components for inclusion in computing devices, appliances, and/or other computing device (s) configured to participate in and/or carry out graph searching or other operations described herein, e.g., for file-analysis or malware-detection purposes.

Network (s) 108 can include any type of wired and/or wireless network, including but not limited to local area networks (LANs), wide area networks (WANs), satellite networks, cable networks, Wi-Fi networks, WiMAX networks, mobile communications networks (e.g., 3G, 4G, and so forth) and/or any combination thereof. Network (s) 108 can utilize communications protocols, such as, for example, packet-based and/or datagram-based protocols such as Internet Protocol (IP), Transmission Control Protocol (TCP), User Datagram Protocol (UDP), other types of protocols, and/or combinations thereof. Moreover, network (s) 108 can also include a number of devices that facilitate network communications and/or form a hardware infrastructure for the networks, such as switches, routers, gateways, access points, firewalls, base stations, repeaters, backbone devices, and the like. Network (s) 108 can also include devices that facilitate communications between computing devices 102 and/or 104 using bus protocols of various topologies, e.g., crossbar switches, INFINIBAND switches, and/or FIBRE CHANNEL switches and/or hubs.

In some examples, network (s) 108 can further include devices that enable connection to a wireless network, such as a wireless access point (WAP). Examples support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), other standards, e.g., BLUETOOTH, cellular-telephony standards such as GSM, LTE, and/or WiMAX.

As noted above, network (s) 108 can include public network (s) or private network (s). Example private networks can include isolated networks not connected with other networks, such as MODBUS, FIELDBUS, and/or Industrial Ethernet networks used internally to factories for machine automation. Private networks can also include networks connected to the Internet and/or other public network (s) via network address translation (NAT) devices, firewalls, network intrusion detection systems, and/or other devices that restrict and/or control the types of network packets permitted to flow between the private network and the public network (s).

Different networks have different characteristics, e.g., bandwidth or latency, and for wireless networks, accessibility (open, announced but secured, and/or not announced), and/or coverage area. The type of network 108 used for any given connection between, e.g., a computing device 104 and cluster 106 can be selected based on these characteristics and on the type of interaction, e.g., ongoing streaming or intermittent request-response communications.

Illustrative Configurations and Data Structures

Figure 2:
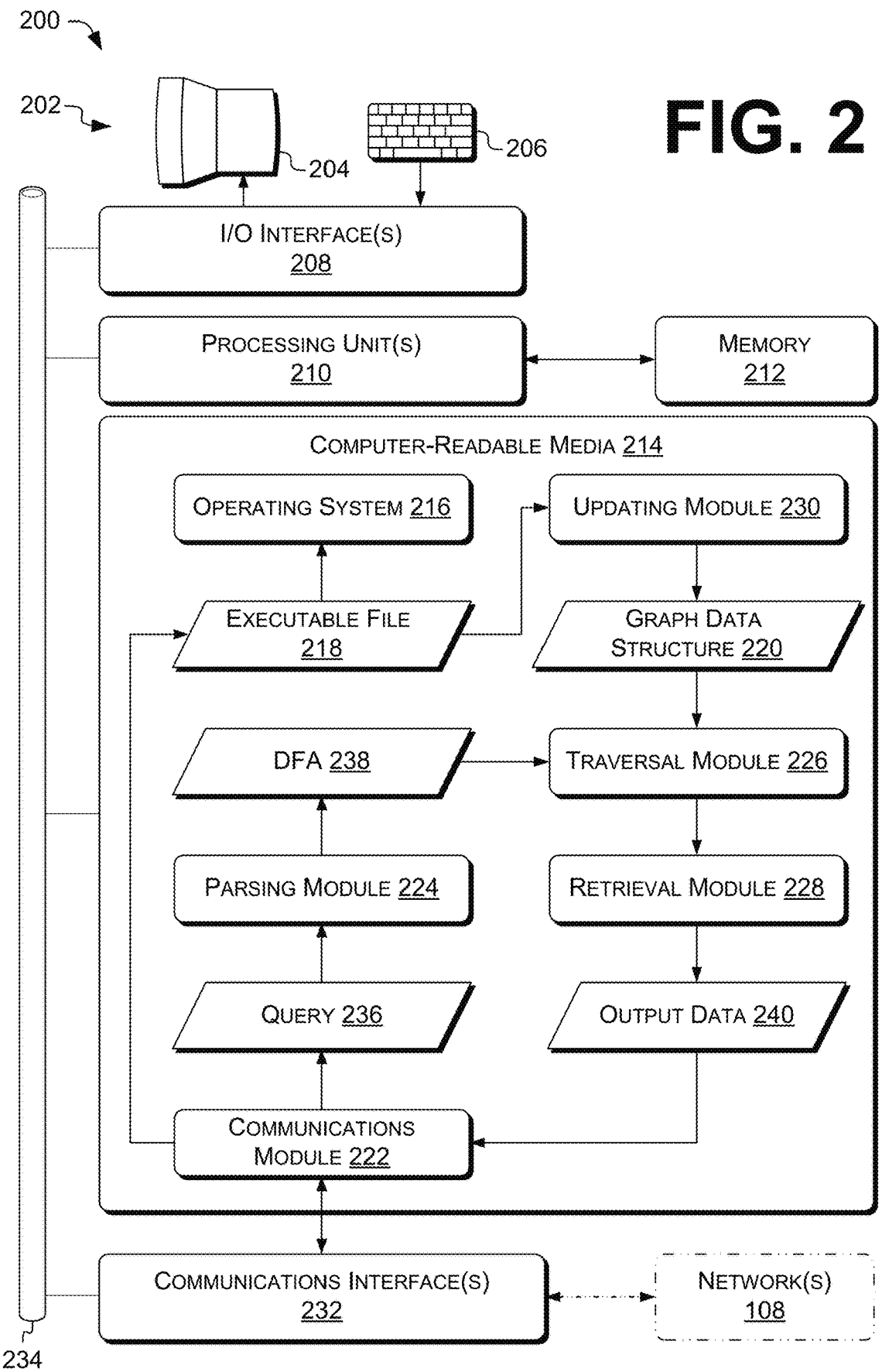
FIG. 2 is a block diagram depicting an example computing device configured to participate in determining or searching graph data structures according to various examples described herein.

FIG. 2 is an illustrative diagram that shows example components of a computing device 200, which can represent computing device (s) 102 and/or 104, and which can be and/or implement a graph-search or other data-retrieval system, device, and/or apparatus, according to various examples described herein. Computing device 200 can include and/or be included in a system and/or device for determining and/or searching a graph as described herein.

Computing device 200 can include and/or be connected to a user interface 202. In some examples, user interface 202 can be configured to permit a user, e.g., entity 110 and/or a graph administrator, to search the graph 112, or to control and/or otherwise interact with cluster 106 and/or computing devices 102 therein. Accordingly, actions such as presenting information of or corresponding to an output of a graph 112 to entity 110 can be taken via user interface 202.

In some examples, user interface 202 can include various types of output devices configured for communication to a user and/or to another computing device 200. Output devices can be integral and/or peripheral to computing device 200. Examples of output devices can include a display 204, a printer, audio speakers, beepers, and/or other audio output devices, a vibration motor, linear vibrator, and/or other haptic output device, and the like. Display 204 can include an organic light-emitting-diode (OLED) display, a liquid-crystal display (LCD), a cathode-ray tube (CRT), and/or another type of visual display. Display 204 can be a component of a touchscreen, and/or can include a touchscreen.

User interface 202 can include a user-operable input device 206 (depicted as a keyboard). User-operable input device 206 can include one or more input devices, integral and/or peripheral to computing device 200. The input devices can be user-operable, and/or can be configured for input from other computing device 200. Examples of input devices can include, e.g., a keyboard, keypad, a mouse, a trackball, a pen sensor and/or smart pen, a light pen and/or light gun, a game controller such as a joystick and/or game pad, a voice input device such as a microphone, voice-recognition device, and/or speech-recognition device, a touch input device such as a touchscreen, a gestural and/or motion input device such as a depth camera, a grip sensor, an accelerometer, another haptic input, a visual input device such as one or more cameras and/or image sensors, and the like. User queries can be received, e.g., from entity 110, via user interface 202.

Computing device 200 can further include one or more input/output (I/O) interface (s) 208 to allow computing device 200 to communicate with input, output, and/or I/O devices (for clarity, some not depicted). Examples of such devices can include components of user interface 202 such as user-operable input devices and output devices described above. Other examples of such devices can include power meters, accelerometers, and other devices for measuring properties of entity 110, computing device 200, and/or another computing device 102 and/or 104. Computing device 200 can communicate via I/O interface 208 with suitable devices and/or using suitable electronic/software interaction methods. Input data, e.g., of user inputs on user-operable input device 206, can be received via I/O interface 208 (e.g., one or more I/O interface (s)). Output data, e.g., of user interface screens, can be provided via I/O interface 208 to display 204, e.g., for viewing by a user.

The computing device 200 can include one or more processing unit (s) 210. In some examples, processing unit (s) 210 can include and/or be connected to a memory 212, e.g., a RAM and/or cache. Processing units 210 can be operably coupled to the I/O interface 208 and to at least one computer-readable media 214 (CRM), e.g., at least one tangible non-transitory computer-readable medium or other computer storage medium.

Processing unit (s) 210 can be and/or include one or more single-core processors, multi-core processors, CPUs, GPUs, GPGPUs, and/or hardware logic components configured, e.g., via specialized programming from modules and/or APIs, to perform functions described herein. For example, and without limitation, illustrative types of hardware logic components that can be used in and/or as processing units 210 include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Digital Signal Processors (DSPs), and other types of customizable processors. For example, processing unit (s) 210 can represent a hybrid device, such as a device from ALTERA and/or XILINX that includes a CPU core embedded in an FPGA fabric. These and/or other hardware logic components can operate independently and/or, in some instances, can be driven by a CPU. In some examples, at least some of computing device (s) 102 and/or 104, FIG. 1, can include a plurality of processing units 210 of multiple types. For example, the processing units 210 in computing device 102 (N) can be a combination of one or more GPGPUs and one or more FPGAs. Different processing units 210 can have different execution models, e.g., as is the case for graphics processing units (GPUs) and central processing unit (CPUs). In some examples at least one processing unit 210, e.g., a CPU, graphics processing unit (GPU), and/or hardware logic device, can be incorporated in computing device 200, while in some examples at least one processing unit 210, e.g., one or more of a CPU, GPU, and/or hardware logic device, can be external to computing device 200.

Computer-readable media described herein, e.g., CRM 214, includes computer storage media and communication media. Computer storage media includes tangible, non-transitory storage units such as volatile memory, nonvolatile memory, and/or other persistent and/or auxiliary computer storage media, removable and non-removable computer storage media implemented in any method and/or technology for storage of information such as computer-readable instructions, data structures, program modules, and/or other data. Computer storage media includes tangible and/or physical forms of media included in a device and/or hardware component that is part of a device and/or external to a device, including but not limited to RAM, static RAM (SRAM), dynamic RAM (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards and/or other optical storage media, magnetic cassettes, magnetic tape, magnetic disk storage, magnetic cards and/or other magnetic storage devices and/or media, solid-state memory devices, storage arrays, network attached storage, storage area networks, hosted computer storage and/or memories, storage, devices, and/or storage media that can be used to store and maintain information for access by a computing device 200.

In contrast to computer storage media, communication media can embody computer-readable instructions, data structures, program modules, and/or other data in a modulated data signal, such as a carrier wave, and/or other transmission mechanism. As defined herein, computer storage media does not include communication media.

In some examples, CRM 214 can store instructions executable by the processing unit (s) 210, and/or instructions executable by external processing units such as by an external central processing unit (CPU) and/or external processor of any type discussed herein. Any of these instructions are referred to herein as computer-executable instructions or processor-executable instructions. For example, CRM 214 can store instructions of an operating system 216. CRM 214 can additionally or alternatively store at least one executable file 218, which can represent a system component. In some examples, operating system 216 can cause processing unit (s) 210 to load computer-executable instructions from executable file 218 into a RAM or other high-speed memory, e.g., memory 212, or to otherwise prepare computer-executable instructions from executable file 218 for execution by processing unit (s) 210. Some examples, e.g., bare-metal embedded-systems configurations, can include a loader but not an operating system 216. Examples herein are discussed with reference to executable file 218 and can additionally or alternatively be used for other types of files, e.g., data files.

In some examples, a "control unit" as described herein includes processing unit (s) 210. A control unit can also include, if required, memory 212, CRM 214, or portions of either or both of those. For example, a control unit can include a CPU or DSP and a computer storage medium or other tangible, non-transitory computer-readable medium storing instructions executable by that CPU or DSP to cause that CPU or DSP to perform functions described herein. Additionally or alternatively, a control unit can include an ASIC, FPGA, or other logic device (s) wired (e.g., physically, or via blown fuses or logic-cell configuration data) to perform functions described herein. In some examples of control units including ASICs or other devices physically configured to perform operations described herein, a control unit does not include computer-readable media storing executable instructions.

Computer-executable instructions or other data stored on CRM 214 can additionally or alternatively include at least one graph data structure (graph) 220, which can represent graph 112, FIG. 1, or instructions of the operating system 216, a communications module 222, a parsing module 224, a traversal module 226, a retrieval module 228, an updating module 230, and/or other modules, programs, and/or applications that are loadable and executable by processing unit (s) 210. Processing unit (s) 210 can be configured to execute modules of the plurality of modules. For example, the computer-executable instructions stored on the computer-readable media 214 can upon execution configure a computer such as a computing device 200 to perform operations described herein with reference to the modules of the plurality of modules. The modules stored in the computer-readable media 214 can include instructions that, when executed by the one or more processing units 210, cause the one or more processing units 210 to perform operations described below. For example, the computer-executable instructions stored on the computer-readable media 214 can upon execution configure a computer such as a computing device 102 and/or 104 to perform operations described herein with reference to the operating system 216 or the above-listed modules 222-230.

In some examples not shown, one or more of the processing unit (s) 210 in one of the computing device (s) 102 and/or 104 can be operably connected to computer-readable media 214 in a different one of the computing device (s) 102 and/or 104, e.g., via communications interface 232 (discussed below) and network 108. For example, program code to perform steps of flow diagrams herein, e.g., as described herein with reference to modules 222-230, can be downloaded from a server, e.g., computing device 102 (1), to a client, e.g., computing device 104 (K), e.g., via the network 108, and executed by one or more processing unit (s) 210 in computing device 104 (K).

The computing device 200 can also include a communications interface 232, which can include a transceiver device such as a network interface controller (NIC) to send and receive communications over a network 108 (shown in phantom), e.g., as discussed above. As such, the computing device 200 can have network capabilities. Communications interface can include any number of network, bus, and/or memory interfaces, in any combination, whether packaged together and/or separately. In some examples, communications interface 232 can include a memory bus internal to a particular computing device 102 or 104, transmitting or providing data via communications interface 232 can include storing the data in memory 212 or computer-readable media 214, and receiving via communications interface 232 can include retrieving data from memory 212 or computer-readable media 214.

In some examples, the communications interface 232 can include, but is not limited to, a transceiver for cellular (3G, 4G, and/or other), WI-FI, Ultra-wideband (UWB), BLUETOOTH, and/or satellite transmissions. The communications interface 232 can include a wired I/O interface, such as an Ethernet interface, a serial interface, a Universal Serial Bus (USB) interface, an INFINIBAND interface, and/or other wired interfaces. The communications interface 232 can additionally and/or alternatively include at least one user-interface device or user interface, at least one bus such as a memory bus and/or local bus, at least one memory interface, and/or at least one hardwired interface such as a 0-20 mA control line.

In some examples, the operating system 216 can include components that enable and/or direct the computing device 200 to receive data via various inputs (e.g., user controls such as input device 206, network and/or communications interfaces such as communications interface 232, devices implementing memory 212, and/or sensors), and process the data using the processing unit (s) 210 to generate output. The operating system 216 can further include one or more components that present the output (e.g., display an image on an electronic display 204, store data in memory 212, and/or transmit data to another computing device 102 or 104. The operating system 216 can enable a user (e.g., entity 110) to interact with the computing device 200 using a user interface 202. Additionally, the operating system 216 can include components that perform various functions generally associated with an operating system, e.g., storage management and internal-device management. In some examples, the operating system 216 or other modules stored in the CRM 214 can be configured to load part or all of the graph 220 from CRM 214 into memory 212 or other relatively higher-speed storage for access by processing unit (s) 210.

In some examples, the processing unit (s) 210 can access the module (s) on the computer-readable media 214 via a bus 234. I/O interface 208 and communications interface 232 can also communicate with processing unit (s) 210 via bus 234. For example, communications interface 232 can exchange data with user interface 202 via bus 234 and I/O interface (s) 208. Bus 234 can include, e.g., at least one of a system bus, a data bus, an address bus, a Peripheral Component Interconnect (PCI) Express (PCIe) bus, a PCI bus, a Mini-PCI bus, any variety of local, peripheral, and/or independent buses, and/or any combination thereof.

In various examples, the number of modules can vary higher and/or lower, and modules of various types can be used in various combinations. For example, functionality described associated with the illustrated modules can be combined to be performed by a fewer number of modules and/or APIs and/or can be split and performed by a larger number of modules and/or APIs. For example, the traversal module 226 and the retrieval module 228 can be combined in a single module that performs at least some of the example functions described below of those modules. In some examples, computer-readable media 214 can include a subset of the above-described modules.

In the illustrated example, the communications module 222 can receive a query 236, e.g., via the communications interface 232. For example, the query 236 can be provided by a user or other entity 110 via user interface 202. Examples are discussed herein, e.g., with reference to at least FIGS. 4-7. Query 236 can represent, e.g., query 114.

In the illustrated example, the parsing module 224 can produce a discrete finite automaton (DFA) 238, which can represent DFA 126, based on the query 236. Examples of producing DFA 238 are discussed herein, e.g., with reference to at least FIG. 4, 5, or 7. The DFA 238 can include at least one state. The DFA can include zero or more transitions, e.g., at least one transition, between state (s) of the DFA 238. In some examples, DFA 238 includes exactly one state and exactly one transition leading from that state back to that state itself, e.g., for the query ⟦parent*⟧, which can return any and all parents, grandparents, and so on, of the entry-point node.

In the illustrated example, the traversal module 226 can traverse the graph 220 in conjunction with the DFA 238 to reach a result node associated with a triggering state of the DFA. Examples are discussed herein, e.g., with reference to at least FIGS. 4-7. The traversal module 226 can traverse the graph 220 in association with the DFA 238 multiple times beginning at respective, different entry-point nodes in the graph 220, in some examples.

Traversal can include successively updating pointers or references to various elements of the graph 220 or the DFA 238 based on conditions specified in query 236 and on connections between nodes of the graph 220 or states of the DFA 238. Reaching a node can include updating such a pointer or reference to point to that node. Traversal can include depth-first search, breadth-first search, or other graph traversal algorithms Various examples of traversal algorithms are described herein with reference to at least Table 2 or FIG. 4, 7, or 8.

In the illustrated example, the retrieval module 228 can retrieve, from memory 212 or another computer memory (e.g., the graph 220, or a database separate from the graph 220), data 240 associated with the result node or an edge of the graph via which the result node was reached during the traversing ("output data"). In discussions of members or organization of data structures herein, the word "hits" refers to output data 240 or other data provided by retrieval module 228, e.g., for use in determining response 116. Data 240 can include, e.g., at least part of a response 116 or classification 120. Data 240 is shown as stored in computer-readable media 214. Data 240 can additionally or alternatively be stored in memory 212 or another processor-accessible storage device, e.g., a transmit buffer of communications interface 232.

In the illustrated example, the communications module 222 can provide the data 240 (or at least a portion thereof), e.g., via the communications interface 232. For example, the indication can be stored into a memory, or transmitted to a computing device 104 via the network (s) 108. Examples are discussed herein, e.g., with reference to at least FIG. 4, 5, or 7.

In some examples, communications module 222 can additionally or alternatively receive security-relevant information 118, depicted as executable file 218, via the communications interface 232. Communications module 222 can provide the security-relevant information 118 to the updating module 230. The updating module 230 can update graph 220 to reflect the security-relevant information 118. In some examples, the SRI 118 can include information of processes and process relationships on a running system. For example, the updating module 230 can do at least one of the following: add nodes to graph 112 to represent newly-spawned processes; add edges between nodes representing parent processes and nodes representing child processes; add edges between nodes representing processes, modules, users, files, or other system components; update or add information at an edge or node; remove nodes or edges upon process termination; or remove nodes or edges associated with stale information. Stale information can include, e.g., edges or nodes of graph 112 that were created, or that were last modified, more than a predetermined time ago (e.g., one hour or one day). Information at an edge or node can include, e.g., representations of behavior patterns of a process or other information about a process. Such information can be stored at a node or at an outgoing edge from that node (e.g., a dangling edge, discussed below).

In some examples, the communications module 222 or another module stored in computer-readable media 214 can be configured to receive inputs, e.g., via user-operable input device 206 or from a filesystem, transmit corresponding queries to a computing device 102, receive responses from computing device 102, and present the responses, e.g., via display 204. In some examples, determination and searching of graphs are carried out on computing device (s) 102. In some examples, determination and searching are carried out on a computing device 104. In some of these examples, any of the above-noted modules can be configured to receive queries and search graph (s) 112 using instructions of parsing module 224 or traversal module 226 based at least in part on those queries, e.g., to determine a response 116. In some examples, computer-executable instructions on computer-readable media 214 can include, but are not limited to, instructions of a Web browser, smartphone app or desktop application, background service conducting or monitoring network communications, or instant-messaging client, or can include components of any of those configured to perform functions described herein. Such programs or components can invoke or include functions of any of the listed modules.

In some examples, the communications module 222 can receive queries 236, data streams, or other data via the communications interface 232. For example, a data stream, e.g., representing a program or file to be analyzed, can include, but is not limited to, code, audio, text, or other file contents. For example, the communications module 222 can receive at least some of a query 236 or a data stream in the form of a HTTP request transmitted via a Transmission Control Protocol (TCP) connection. In some examples, the data stream can be retrieved from computer-readable media 214 instead of or in addition to being received via communications interface 232. In some examples, a query 236 or data stream can be associated with a user, e.g., entity 110. For example, an HTTP request conveying the data stream, e.g., in a body of the request, can include a URL parameter, HTTP cookie, or other data carrying identifying information or credentials associated with the entity 110.

In some examples, the communications module 222 can transmit an indication of the output 240 via the communications interface 232. Examples are discussed herein, e.g., with reference to FIGS. 1 and 4. For example, the communications module 222 can transmit data of or indicating a response 116 or classification 120 in an HTTP response header or body, or other response to a request or unprompted transmission. In some examples, the communications module 222 can transmit a filename, hash, or other indication of a data stream accompanying or associated with a data stream. This can permit, e.g., exchanging classifications between databases or between a user's computer and a cloud service.

FIG. 3 illustrates data structures 300 in an example implementation of a query 302, a DFA 304, and a graph 306. Query 302 can represent query 114 or 236. DFA 304 can represent DFA 238. Graph 306 can represent graph 112 or 220. For the sake of brevity, throughout the remainder of this Detailed Description, references to system components (e.g., processes or files) refer to nodes representing those system components, unless otherwise indicated. Moreover, " " is used in QL expressions to indicate omission of a portion of the query for clarity of discussion.

As used herein, a "next hop" refers to the connected element (s) of the graph 306 that can be tested against a single term 308 of the query 302, as discussed below. In some examples, a next hop comprises or consists of an outgoing edge and, if that outgoing edge terminates at a node, that node.

In the illustrated example, the query 302 is ⟦child* child module [ifn=~'*.exe', :ret]⟧. This can be used to determine a module, e.g., an executable file ending with a ".exe" extension, associated with any child processes spawned by a process represented by an entry-point node in the graph 306, or any of its descendants. In the example QL herein, the "x=~y" operation returns true if variable or other data item "x" matches pattern "y". Negated matching, "x!~y", returns true if data item "x" does not match pattern "y". For example, ⟦["foo.exe"=~"*.exe"]⟧ returns true, and ⟦["foo.exe"!~"*.so"]⟧ also returns true. Patterns can be expressed using various languages, e.g., POSIX shell patterns or regular expressions.

A query 302 includes at least one term 308. Each term 308 expresses at least one condition that should hold in order to traverse an edge of the graph 306 and a transition of the DFA 304. In the illustrated example, three terms 308 (1)-308 (3) are shown, namely, ⟦child⟧, ⟦child⟧, and ⟦module [...]⟧. Term 308 (1), ⟦child⟧, matches (i.e., is satisfied by) an edge between a node representing a parent process and a node representing a child process. Term 308 (2), ⟦child⟧, likewise matches an edge from a parent process (i.e., from a node representing the parent process) to a child process.

Term 308 (1) is followed by an operator 310. Operator 310 is the Kleene star, ⟦*⟧, which is a unary postfix operator, in this example. The combination of operator 310 and its operand, term 308 (1), is ⟦child *⟧. This portion of the query will match a sequence of zero or more "child" edges. In some examples, the Kleene star or other operators can be used. Other operators can include the Kleene plus, ⟦+⟧, or counted repetition operators, ⟦{count}⟧, ⟦{min, max}⟧, ⟦{min, }⟧, or ⟦{, max}⟧ (with an omitted min assumed to be 0 and an omitted max assumed to be ∞). In some examples, the query does not contain a Kleene star, or the query language does not provide a Kleene star. In some examples, an operator 310 can apply to a term 308 that includes a group of terms. An example of such a query is ⟦ (module wrote_file[edge.event=~'ExecutableWritten', :ret written_filename])*⟧. This query can be used to trace the operation of a chain of installers that execute, write files (e.g., by unpacking them from an archive), and execute the newly-written files.

Term 308 (3), ⟦module [ifn=~'*.exe', :ret]⟧, is satisfied by an edge between a node representing a process and a node representing a file on disk, provided that file on disk has an image file name ("ifn") matching the pattern '*.exe' (i.e., ending with the characters ".exe"). Term 308 (3) includes an edge condition 312, here ⟦module⟧. Term 308 (3) also includes a node condition 314 (in single brackets). Term 308 (3) is satisfied by a particular next hop only if both the edge condition 312 and the node condition 314 are satisfied by that next hop.

The node condition 314 includes a predicate 316, here ⟦[ifn=~'*.exe']⟧, and an action 318, here ⟦[:ret]⟧. A node condition 314 includes at least one predicate or at least one action. A node condition 314 can include zero or more predicates and zero or more actions. In some examples, edge conditions 312 or node conditions 314 (e.g., predicates 316) can include at least one of a Boolean expression or a numerical expression. In some examples, the ":ret" action is a "return" instruction that causes data to be retrieved or provided, e.g., as discussed herein with reference to operation 420. When a ":ret" action is executed during traversal, information associated with a present node of the traversal is recorded, or otherwise prepared for inclusion, in data 240. Although actions 318 are shown as part of node condition 314 in this example, in other examples, actions 318 can be listed separately from node conditions 314.

The illustrated DFA 304 corresponding to query 302 has three states 320, 322, and 324, labeled "S1," "S2," and "S3," respectively. State 320 has a transition labeled "A" to state 320 and a transition labeled "B" to state 322. State 322 has a transition labeled "C" to state 324. In this figure, state 320 is an example of an initial state 326 from which traversal of the DFA begins during search processes such as those described herein with reference to FIGS. 4-7. In this figure, state 324 is an example of a triggering state 328 that causes data to be retrieved, e.g., as discussed herein with reference to operation 420. A DFA 238 can have one state or more than one state. In some examples of a DFA 238, the DFA has only one state, and that state is both the initial state 326 and the triggering state 328. An example of such a query is ⟦child *⟧, which follows any and all child edges as far as possible through the graph.

As indicated by the dotted arrows, transition A from state 320 to state 320 corresponds to term 308 (1) together with operator 310, ⟦child *⟧. A node with a conditional transition to itself is a common way of implementing Kleene closure. As discussed below, the DFA 304 can remain in state 320 as long as an edge satisfying the edge condition ⟦child⟧ is available to traverse.

Transition B from state 320 to state 322 corresponds to term 308 (2), ⟦child⟧. The DFA 304 can transition from state 320 to state 322 if an edge satisfying the condition ⟦child⟧ is available to traverse.

Transition C from state 322 to state 324 corresponds to term 308 (3), 〚 module[...] 〛. The DFA 304 can transition from state 322 to state 324 if an edge is available to traverse that satisfies the edge condition 312 and terminates in a node satisfying the edge condition 314, e.g., a node satisfying the predicate 316.

Graph 306 represents an example tree of processes and related system components. Node 330 of graph 306 represents a shell process, such as bash, csh, or (as shown) cmd.exe. The shell process has spawned child processes represented by nodes 332 and 334 ("Child 1" and "Child 2"). The edges from node 330 to nodes 332 and 334 are labeled "Child" to indicate they represent parent-process-to-child-process associations. Consequently, those edges satisfy the term 〚 child 〛.

Node 336 represents the primary module being run by child 1 (node 332). In this example, child 1 (node 332) is a host process running a dynamically-loadable addon (e.g., a ".so" or ".dll" file; here, "floyd.so"). Consequently, node 336 represents the addon (as opposed to the runner, e.g., svchost.exe in a MICROSOFT WINDOWS system). The edge from node 332 to node 336 is labelled "Module" to indicate it represents a process-to-module association, and thus satisfies the term 〚 module 〛.

Node 338 represents the primary module being run by child 2 (node 334). In this example, child 2 (node 334) is running a main executable (e.g., a ".exe" file; here, "oldfield.exe") represented by node 338. The edge from node 334 to node 338 represents this association, similarly to the edge from node 332 to node 336.

Node 340 represents a child process spawned by child 2 (node 334). Node 340 thus represents a grandchild process of the shell (node 330). The edge from node 334 to node 340 is similar to the edges out of node 330. Similarly, node 342 represents the executable being run by the grandchild process (here, "bach.exe"), and the edge into node 342 is similar to the edge into node 338.

As shown, graph 306 is a directed graph. Each node can have zero or more outgoing ("out") edges, and zero or more incoming ("in") edges. In some examples, each edge is connected to at least one of, and at most two of, the nodes. In some examples, each edge is an outgoing edge of exactly one node, and is an incoming edge of either no node (a "dangling edge") or exactly one node. In some examples, dangling edges are considered incoming edges, outgoing edges, or neither incoming nor outgoing edges. In an example, a "file_written" edge may connect a node representing a process to a node representing a file written by that process. However, if the file is not represented by a node, the "file_written" edge can be left dangling, and the filename, hash, or other fields storing information of or about the file can be attached to the dangling edge. Graph 112 includes one dangling edge, depicted as an edge terminating in a circle rather than an arrow.

In the illustrated example, from node 334, there are two next hops: next hop 344 including node 338 and its incoming "module" edge, and next hop 346 including node 340 and its incoming "child" edge. In other examples, a next hop comprises or consists of an outgoing edge. In still other examples, a next hop next hop comprises or consists of an outgoing edge and at least one node reachable via a respective path including that outgoing edge.

Examples of traversing DFA 304 in conjunction with graph 306 to provide results to query 302 are discussed herein with reference to at least FIGS. 4-7. In some examples below, node 330 (the shell) is the entry-point node 348 at which a search begins, although that is not limiting. A search can begin at any node of graph 306, in various examples. For convenience herein, a "job" is a query 302 associated with a particular entry-point node 348. Jobs are denoted "(entry-point node)→〚 ... 〛" herein. However, this is not limiting as to syntax. In some examples, a query can include an entry-point specifier. For example, the query 〚 [[330]] child module 〛 can designate the job (node 330)→〚 child module 〛. In some examples, an entry-point specifier can include database keys, search expressions, key-value pairs, or other data that permits locating the entry-point node 348. Such values can include at least one of a process ID, module name, file hash, user-session identifier, malware-detection event, hostname (e.g., DNS name), or computer name or other identifier, e.g., of a computing device 104.

In the example of FIG. 3, the job (node 330) 〚 child* child module [ifn=~'*.exe', :ret] 〛 determines that nodes 338 and 342 are result nodes 350 (see Table 2, below). In examples in which the 〚 :ret 〛 action returns the image file name associated with each result node 350, the query results will be "oldfield.exe" (from node 338) and "bach.exe" (from node 342). No results are provided for node 336, since its image file name, "floyd.so", does not match the pattern '*.exe' expressed by predicate 316. No results are provided for nodes 332, 334, or 340 since they cannot be reached from entry-point node 348 via a "module" edge, as expressed by edge condition 312. No results are provided for node 330 since it cannot be reached from entry-point node 348 (itself) via a "child" edge and a "module" edge, as expressed by term 308(2) and edge condition 312.

In another example, the job (node 330)→〚 [ifn=~'*.exe'] 〛 returns "cmd.exe", since node 330 satisfies the predicate 〚 [ifn=~'*.exe'] 〛. In still another example, the job (node 334)→〚 child* child module [ifn=~'*.exe', :ret] 〛 returns "bach.exe" from node 342. That job does not also return "oldfield.exe" (node 338) because node 338 is not reachable via a child edge and a module edge from node 334, but instead only via a module edge.

The illustrated example graph 306 also includes a node 352 representing the session in which the illustrated processes are running. Node 352 can include or link to data 354 of a username of the user under whose credentials the session was established. As indicated by the dotted arrows, each of nodes 330, 332, 334, and 340 can be linked via a respective outgoing edge to node 352.

FIG. 3 also shows example data 356, which can represent data 240. Data 356 can be included in response 116. Data 356 includes two records, numbered 0 and 1. In the illustrated example, each record includes four fields: the image filename for the corresponding module, the process ID of the pertinent child (e.g., as a "virtual field" per operations 514-518), a username, e.g., of the owner of the module file on disk or of the user as which the module is currently executing, and a hash of the module's contents, e.g., produced by a Secure Hash Algorithm (SHA) SHA-2 or SHA-3-family hash function or other hash function. Hash functions of various types can be used, e.g., cryptographic or locality-sensitive hash functions.

Additionally or alternatively, data 240 can include the command line of an executing process, the type of edge via which a result node was reached (e.g., "child" or "module"), or other data associated with an edge. For example, edge types can include "child" (from parent process to child process), "parent" (vice versa), "module" (from process to file including the initial code for that process), "user" (from process to user), "session" (from process, user, or other node to a node representing a user's present login session), "wrote" (from process or module to a node representing a file, e.g., in CRM 214), or other types. Data associated with an edge can include, e.g., the filename on an edge between a node representing a process and a node representing a file having a particular hash, in examples in which hashes are computed without respect to filename. Additionally or alternatively, data 240 can include the name of an event represented by an edge or node or other information of such an event, e.g., a timestamp of the event. Additionally or alternatively, data 240 can include data from other databases or data sources, e.g., as discussed herein with reference to operation 518.

The records can be represented as respective members of an array, e.g., hits[0] and hits[1]. Additionally or alternatively, the records can be represented using named fields in a single record, e.g., hits.rec0 and hits.rec1. Additionally or alternatively, record indicia can be applied to the fields, e.g., hits.ifn[0] and hits.ifn[1] or hits.ifn0 and hits.ifn1.

In some examples in which a particular record has multiple fields of the same name, the fields can be distinguished in the output record using unique names or array indices based on field, using any of the patterns in the preceding paragraph. For example, the query 〚 parent [:ret pid] parent [:ret pid] 〛 provides, in a single record the process identifiers (PIDs) of two different "parent" nodes, e.g., a parent and a grandparent of the entry-point node. For a particular record R=hits[n], this can be identified as, e.g., R.pid0 and R.pid1; R.pid[0] and R.pid[1]; or R[0].pid and R[1].pid, among other nonlimiting examples.

In some examples, edge fields can be grouped into a sub-record, or node fields can be grouped into a record. An example is a record in which node fields are "hits.name" and edge fields are "hits.edge.name". Similarly, virtual fields or other fields from other data sources, e.g., as discussed herein with reference to operations 516, 518, and 522, can be included in a sub-record, e.g., "hits.data-source-name field-name".

In some examples, e.g., discussed below with reference to FIG. 8, state 324 is an example of a terminal state 358.

In some examples, traversal can proceed in opposite the direction of at least one edge of the graph 112. For example, the job (node 338)→〚 module_of_child_of 〛 can follow the "module" edge backwards from node 338 to node 334, then follow the "child" edge backwards from node 334 to node 330. This job can therefore return node 330 as a result node. An equivalent query in another QL syntax can be 〚 module [edge.direction=~'in'] child[edge.direction=~'in']〛, assuming "edge.direction" refers to the direction of the just-traversed edge at the node from which the edge was traversed. Another example syntax can be 〚 ^module^child 〛, with prefix "^" indicating an incoming edge should be traversed rather than an outgoing edge.

In still another example, at least one edge condition 312 can be associated with a traversal direction, e.g., in a lookup table or other stored data indexed by edge condition 312 and by the type (s) of connected node (s). For example, the query 〚 loaded 〛 can cause traversal of edges that extend from nodes representing processes to nodes representing modules loaded by those processes. The direction of traversal can be determined, at any step of traversal, by looking up the present node's type and the edge's type in the lookup table. For example, if the present node represents a process, the "loaded" edge can be traversed in the direction of that edge. If the present node represents a module, the "loaded" edge can be traversed opposite the direction of that edge. Similarly, 〚 module 〛 can represent traversal of "module" edges that point from processes to modules. In the example of graph 306, the job (node 338)→〚 module 〛 can traverse the "module" edge opposite the direction of that edge and return node 334. The job (node 334)→〚 module 〛 can traverse the "module" edge in the direction of that edge and return node 338.

Automatically determining traversal direction can improve usability of the query language by removing the need for the author of a query to remember the directionality of all the edge types in the graph. Improving usability can reduce the processing- and network-resource usage of queries by reducing the likelihood that a user will specify a job that is not semantically meaningful in a particular graph 112, e.g., (node 338)→〚 module 〛 in a system that only traverses outgoing edges. In some examples, a query can use either of, or both of, automatic and express determination. For example, the job (node 338)→〚 module ^child 〛 can use automatic determination to traverse the "module" edge to node 334, then use the express "^" specifier to traverse the "child" edge to node 330.

Throughout this document, for clarity of discussion, reference is made to traversing a graph by successively following outgoing edges (except when unwinding). In any examples herein, if the query 114 indicates that an edge should be traversed opposite its direction, the traversal can include following that edge as an incoming edge rather than an outgoing edge. In some examples, the query 114 can expressly specify the direction of edge to traverse at any node and of any type. For example, using subqueries as discussed herein with reference to FIG. 7, the job (node 334)→〚 :include (module) ^child 〛 can traverse the edge to node 338 in that edge's direction and can traverse the edge to node 330 opposite that edge's direction. The results of such a job can include nodes 330 and 338. Traversal module 226 can perform operations such as those described in this paragraph and the preceding three paragraphs, in various examples.

Illustrative Processes

Figure 4:
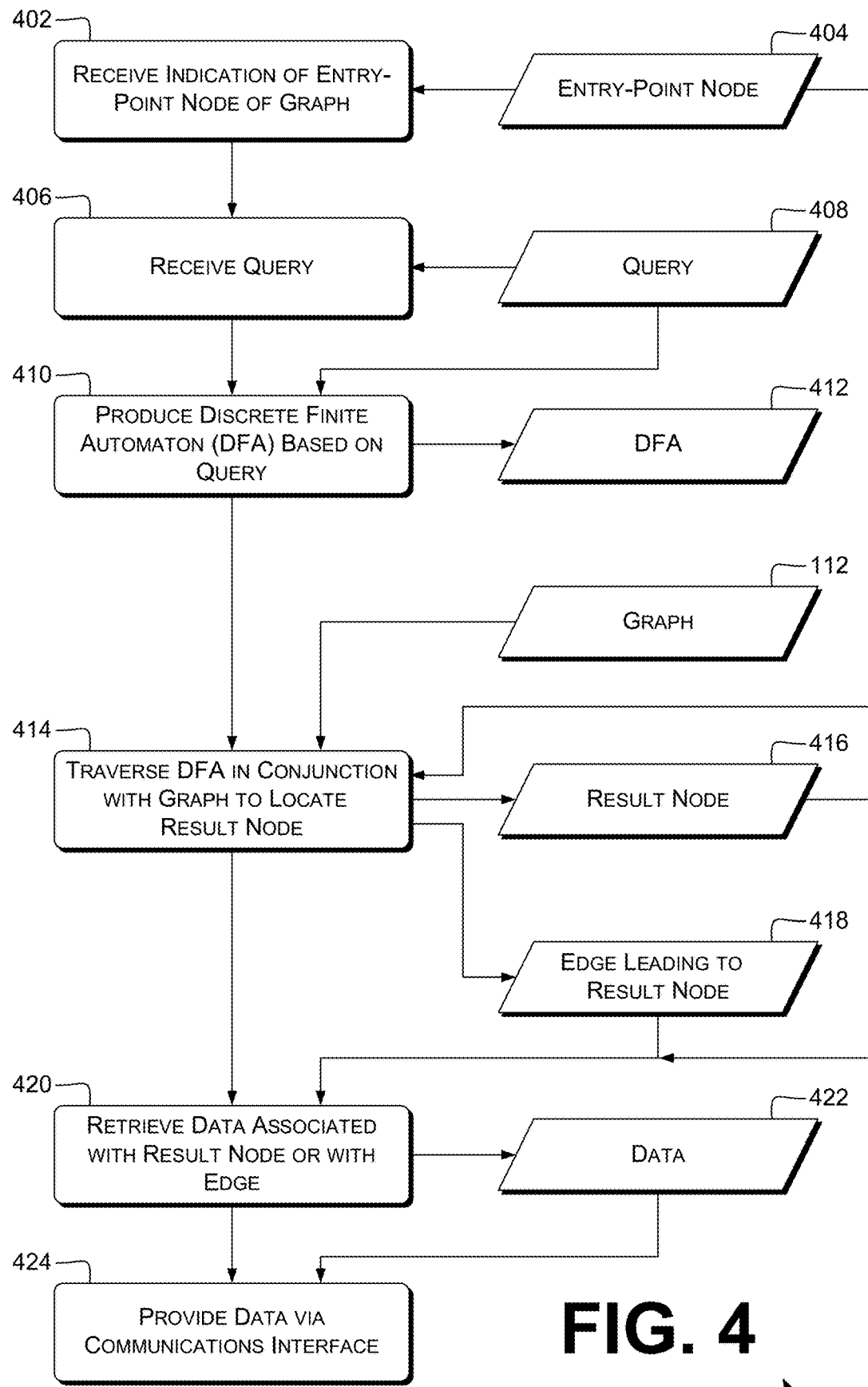
FIG. 4 is a dataflow diagram that illustrates example processes for searching graphs according to various examples described herein.

FIG. 4 is a dataflow diagram that illustrates an example process 400 for searching graph (s) such as graphs 112, 220, or 306, and related dataflow. For example, process 400 can permit retrieving data from a graph 112 in a computer memory 212, 214.

Example functions shown in FIG. 4 and in other flow diagrams and example processes herein, such as FIGS. 5-10, can be implemented on and/or otherwise embodied in one or more computing device (s) 102 and/or 104, e.g., a computing device 200, e.g., using software running on such device (s), e.g., software executed by processing unit (s) 210. For the sake of illustration, the example process 400 is described below with reference to processing unit 210 and other components discussed with reference to FIGS. 1 and 2 (e.g., a control unit), and with respect to data structures shown in FIG. 3, that can carry out, participate in, or be processed by the steps of the example process 400. However, other processing unit (s) such as processing unit (s) 210 and/or other components of computing device (s) 102 and/or 104 can carry out step (s) of described example processes such as process 400. Similarly, example method (s) or process(es) shown in FIGS. 5-10 also can be carried out by, but are not limited to being carried out by, any specifically-identified components.

In software embodiments of the processes, e.g., illustrated in FIGS. 4-10, the number or arrangement of modules performing functions described herein may be different from that shown in FIG. 2. Accordingly, references to specific modules performing operations described herein are for clarity, and also envision other modules that may perform those operations. In embodiments using a control unit that does not execute computer program instructions, e.g., an FPGA or ASIC, references to specific modules below also envision sections of the hardware of such a control unit that cause the control unit to perform the described operations.

The order in which the operations are described in each example flow diagram and/or process is not intended to be construed as a limitation, and any number of the described operations can be combined in any order and/or in parallel to implement each process. In each flow diagram, fewer than all of the depicted operations can be performed, except as expressly noted. Moreover, the operations in each of FIGS. 4-10 can be implemented in hardware, software, and/or a combination thereof. In the context of software, the operations represent computer-executable instructions that, when executed by one or more processors, cause the one or more processors to perform the recited operations. In the context of hardware, the operations represent logic functions implemented in circuitry, e.g., datapath-control and finite-state-machine sequencing functions. Therefore, descriptions of operations below also describe such software or hardware structures to carry out the described functions. Operations herein can be performed by modules described herein with reference to FIG. 2.

Various of the following figures provide more details of example implementations of the operations shown in FIG. 4. In some examples, operation 410 can include operations 502-506, operation 514, operation 524, or operations 802, 806, or 810. In some examples, operation 410 can include or be followed by operations 702 and 708. In some examples, operation 414 can include operations 508-512, operation 516, operations 526-528, operations 602-620, operations 716-730, or operations 804, 808, 812, or 814. In some examples, operation 420 can include operation 518 or operation 722. In some examples, operation 424 can include operation 522 or operation 732.

In some examples, at operation 402, communications module 222 can receive an indication of an entry-point node 404 of the graph 112. The graph 112 can include nodes and edges connecting at least some of the nodes. The indication can include, e.g., at least one of a pointer to the entry-point node 404 in the graph 112, a disk address of the entry-point node 404 in a page file, B-tree, or other backing store (e.g., on-disk) for the graph, a path through a search tree to locate the node, or key(s) or other value(s) stored in or otherwise associated with the entry-point node. For example, the indication may include identifer(s) of a particular monitored computing device 104 and a particular system component (e.g., process or file) on that computing device 104.

In some examples, at operation 406, communications module 222 can receive a query 408, which can represent query 114 or 236. For example, communications module 222 can receive an AJAX XMLHttpRequest or other transmission including text of the query 408, e.g., in ASCII, UTF-8, or another character encoding. Operation 406 can include converting text in a provided encoding, e.g., ISO-8859-1, into a preferred encoding, e.g., UTF-8.

In some examples, operation 406 can include receiving the query 408 via the communications interface 232 on a channel communicatively connected with a user interface 202. The channel can be, e.g., an established TCP connection, or an endpoint (e.g., hostname, host:port pair, or file path to a FIFO) permitting communications with the user interface 202. In some examples, the channel is an HTTP connection via which the query 408 is received, e.g., as a query parameter in the Request-URI, as a header, or as a portion of a message body, e.g., in a multipart/form-data or application/x-www-form-urlencoded body. In some examples, the channel can be implemented using Web techniques such as AJAX, Comet, or Web Sockets.

In some examples, at operation 410, parsing module 224 can produce a discrete finite automaton (DFA) 412, which can represent DFA 238 or 304, based on the query 408. The DFA 412 can include one or more states, e.g., a plurality of states. The DFA 412 can also include one or more transitions connecting at least some of the states, e.g., one state to another, or a state to itself. The states can include an initial state 326. The states can additionally or alternatively include a triggering state 328. The initial state 326 and the triggering state 328 can be the same state or different states. The DFA 412 can include any number of triggering states 328.

In some examples, a triggering state 328 can be a state at which a particular action should be taken, e.g., retrieving data as described below. In the example QL described herein, any state associated with a ⟦[:ret]⟧ action 318, whether explicitly or after preprocessing as discussed below, is a triggering state 328.

In some examples, the parsing module 224 can parse the text of the query 408 using a recursive-descent, shift-reduce, or other parser. The text of the query 408 can be expressed in a particular QL, and the parsing module 224 can implement a parser for that particular QL. An example parser for the QL of query 302, for example, can include production rules such as those shown in Table 1, below (expressed in pseudo-Backus-Naur Form, BNF, with regex qualifiers, terminals in quotes, and nonterminals in angle brackets). In some examples, the parsing module 224 can be partly or wholly constructed from a set of production rules, e.g., using tools such as the YACC/lex toolchain, the flex/Bison toolchain, pyparsing, or other compiler generators.

The parsing module 224 can be configured to produce an abstract syntax tree (AST) (or other internal representation, and likewise throughout this document) of the query 408. Parsing module 224 can then produce the DFA based on the AST using, e.g., a regular-expression compiler. Examples are discussed herein, e.g., with reference to operation 504. Other parsing, DFA compilation, or interpretation techniques can additionally or alternatively be used.

TABLE 1

| | |
|---|---|
| <query> ::= | <term> ( <operator>? <term> )* |
| <term> ::= | '[' <node-condition> ']' \| |
| | <edge-condition> ( '[' <node-condition> ']' )? |
| <node-condition> ::= | ( <predicate> \| <action> ) ( ',' ( <predicate> \| <action> ) )* |

In some examples, parsing module 224 can preprocess the AST to provide a modified AST, then produce the DFA based at least in part on the modified AST. Examples in the remainder of the discussion of operation 410 are discussed with reference to a ":ret" action. However, this is not limiting, and recited operations can be carried out with respect to other types of actions, in any combination. In some examples, the parsing module 224 can apply preprocessing transformations specific to a particular type of output. For example, ⟦ [:ret] ⟧ can be preprocessed to ⟦ [:ret all] ⟧ for JSON output, or to ⟦ [:ret some] ⟧ for CSV output. This can reduce the storage required to specify queries, and can reduce the probability that a user will unintentionally request unnecessary data and thereby trigger increased bandwidth and storage costs.

In some examples, parsing module 224 can add default action (s) to the AST. For example, if a query 408 does not include any ":ret" actions 318 or other required actions (e.g., as defined by a QL or by user preferences), parsing module 224 can add default actions, e.g., ⟦ [:ret] ⟧ action 318. In some examples, accordingly, parsing module 224 can determine that the query 408 does not include a required action (e.g., a ":ret", or at least one action from a non-empty set of required actions). This can be done, e.g., by inspecting the text of the query 408, or by traversing the AST and checking for the presence of required action (s). In response to determining that the query 408 does not include a required action, the parsing module 224 can add at least one default action to the query. A default action can be a required action, although this is not required.

In an example, the query ⟦ parent parent ⟧ can be preprocessed into ⟦ [:ret] parent [:ret] parent [:ret] ⟧. A DFA for this example query would thus have three triggering states, corresponding to the three ⟦ [:ret] ⟧ actions. The default actions can have no parameters, or predetermined or user-specified parameters. For example, the above query can be preprocessed into ⟦ [:ret (ifn, cl)] parent [:ret (ifn, cl)] parent [:ret (ifn, cl)] ⟧ in response to the predetermined or user-specified parameters being image filename ("ifn") and command line ("cl").

In some examples, parsing module 224 can add default parameters to the AST. For example, parsing module 224 can transform ⟦ [:ret] ⟧ into ⟦ [:ret (ifn, cl)] ⟧ to cause ":ret" actions 318 to return the image file name and the command line ("cl") of the process if no parameters of the :ret are specifically indicated. In some examples, parsing module 224 can add parameters even if some parameters are already specified, e.g., converting ⟦ [:ret username] ⟧ to ⟦ [:ret (username, ifn, cl)] ⟧. In other examples, parsing module 224 can add parameters only if no parameters are specified, so ⟦ [:ret username] ⟧ would be left unchanged.

In some examples, parsing module 224 can expand shorthand used in the query 408 or the AST. For example, parsing module 224 can expand the "all" in query ⟦ [:ret all] ⟧ into a list of all known fields, e.g., into ⟦ [:ret (ifn, cl, username, hash, . . . )] ⟧. Additionally or alternatively, the parsing module 224 can expand the "some" in query ⟦ [:ret some] ⟧ into a predefined list of parameters. For example, ⟦ [:ret some] ⟧ can be expanded into ⟦ [:ret (ifn, cl)] ⟧. In some examples, default parameters can be added as in the preceding paragraph, or "some" can be expanded as in this paragraph, based at least in part on the type of edge in the corresponding term. For example, ⟦ child [:ret] ⟧ or ⟦ child [:ret some] ⟧ can be expanded to ⟦ child [:ret (ifn, cl)] ⟧, whereas ⟦ module_written [:ret] ⟧ or ⟦ module_written [:ret some] ⟧ can be expanded into ⟦ module_written [:ret TargetFileName] ⟧. This can be done, e.g., by looking up the edge type listed in a term 308 (e.g., "child" or "module_ written") in a table of default parameters, and applying those default parameters to an action 318 in that term 308.

In some examples, at operation 414, the traversal module 226 can traverse the DFA in conjunction with the graph 112, beginning at the initial state 326 and the entry-point node 404, to locate a result node 416 of the graph 112. The result node 416 can be associated with the triggering state 328. In some examples, operation 414 can also include determining an edge 418 of the graph 112. The edge 418 can be connected with the result node 416, e.g., an incoming or outgoing edge of the result node 416. In some examples, the edge 418 can be a dangling outgoing edge of the result node 416. In some examples, the edge 418 can be an edge connected with the result node 416 and via which the result node 416 was reached during the traversing (an incoming edge of the result node 416). In some examples, the edge 418 can be an edge along which traversal proceeded before reaching the result node 416. Examples of traversal are described herein with reference to FIGS. 5-10.

In some examples, at operation 420, the retrieval module 228 can retrieve, from the computer memory 212 (or CRM 214 or other sources), data 422 associated with at least one of the result node 416 or the edge 418.

In some examples, at operation 424, the communications module 222 can provide the data 422 via communications interface 232. Example formats, protocols, and transmission methods are discussed above. In some examples in which the query 408 is received via a channel, as noted above with reference to operation 406, operation 424 can include providing the data via the communications interface 232 on the channel communicatively connected with the user interface 202. For example, the results can be provided as an application/j son message body in an HTTP 200 OK response.

Figure 5:
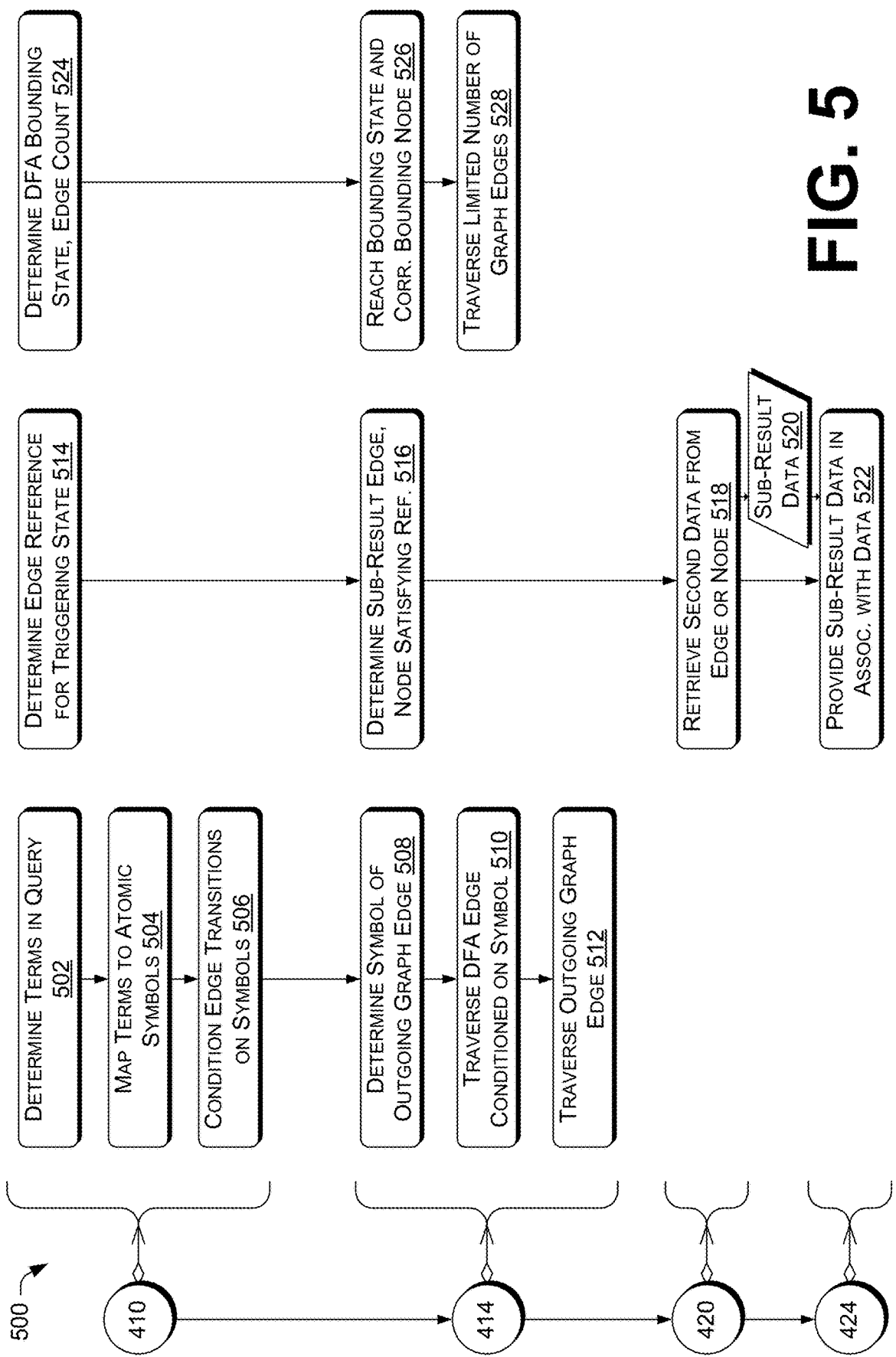
FIG. 5 is a dataflow diagram that illustrates example processes for searching graphs according to various examples described herein.

FIG. 5 is a flow diagram that illustrates example processes 500 for searching graph (s). Process 400, FIG. 4, can include various operations of processes 500, as noted herein.

In some examples, at operation 502, parsing module 224 can determine at least one term 308, or at least two terms 308, in the query. Each term 308 can represent, e.g., a condition to be tested with respect to a next hop. As discussed above, a next hop can include an edge of the graph 112 (e.g., edge condition 312) or a node at which that edge terminates (e.g., node condition 314 including predicate 316).

In some examples, at operation 504, parsing module 224 can determine at least two atomic symbols associated with respective ones of the at least two terms. In the example of FIG. 3, symbol "A" is associated with term 308 (1), symbol "B" is associated with term 308 (2), and symbol "C" is associated with term 308 (3). As used herein, an "atomic symbol" is a representation of a condition that can be tested with respect to a particular graph node and its outgoing edges (or next hops). For example, the representation can be, or can be used as, a key in an associative array, or an index in an array. In some examples, an atomic symbol represents only an edge condition, only a node condition, or both an edge condition and a node condition. In example query 302, FIG. 3, atomic symbol "A" represents only an edge condition, atomic symbol "B" represents only an edge condition, and atomic symbol "C" represents both edge condition 312 and node condition 314.

Letters are used to represent atomic symbols herein, but that is not limiting. Additionally or alternatively, any of the following can be used as atomic symbols: letters, digits, punctuation characters, other symbols or characters in a character set, pointers to (e.g., addresses of) unique data items representing the atomic symbols, e.g., instances of an AtomicSymbol class, numeric indices, handles, hashes, UUIDs or similar, or other distinguishable identifiers that can be used to look up details of a term 308.

In some examples, at operation 506, parsing module 224 can produce the DFA 412 having at least some of the one or more transitions of the DFA 412 conditioned on occurrences of respective symbols of the at least two atomic symbols. For example, at least one transition from at least one state, or all transitions, can be conditioned on occurrences of respective atomic symbols. DFA 304, FIG. 3, is an example. DFA 304 can be produced, e.g., using a regular-expression ("regex")-to-DFA compiler (or regex-to-NFA-to-DFA compiler) provided with the regex /A*BC/. In that regex, "A," "B," and "C" represent atomic symbols. Similarly, parsing module 224 can produce DFA 412 for a well-formed query 408 by replacing each term 308 in that query 408 with the respective atomic symbol, assembling the atomic symbols and operators (e.g., operator 310) into a regex, and compiling the regex into a DFA.

In another example of operation 506, the parsing module can determine, for the query ⟦ child sibling child ⟧, the regex /ABC/. In this example, even though the edge condition ⟦ child ⟧ occurs twice, each occurrence corresponds with a respective, different atomic symbol. This can permit unambiguously processing queries involving Kleene closure or alternation. This query can then match, e.g., the "grep" process in the bash pipeline "ls | sh -c 'grep foo'", given "bash" as the entry-point node.

In some examples, traversal module 226 can carry out the traversing at least partly by repeatedly performing operations 508-512.

In some examples, at operation 508, traversal module 226 can determine, for a present node of the graph 112 and a present state of the DFA 412, a first symbol of the atomic symbols corresponding to a first outgoing edge of the present node. Operation 508 can include selecting the first outgoing edge from among one or more outgoing edges of the present node, in some examples. For example, at node 330 of graph 306 and state 320 of DFA 304, both "child" edges can correspond to atomic symbol "A" or to atomic symbol "B".

As noted above with reference to FIG. 3, this discussion is in terms of outgoing edges for brevity and clarity. However, other examples can include determining a first symbol of the atomic symbols corresponding to a first edge of the present node without regard to whether that edge is an outgoing edge, or with respect to an edge direction determined automatically or specified in the query. Therefore, the first edge can be an incoming edge or an outgoing edge, in some examples.

In some examples, traversal module 226 can determine the outgoing transitions from the present state (e.g., "A" and "B" from state 320), and look up the corresponding query terms 308 (e.g., terms 308 (1) and 308 (2)), e.g., in an associative array or other mapping data structure. Traversal module 226 can then locate next hops (each an outgoing edge and node at the end of that edge, if any) satisfying the corresponding terms 308. In some examples, traversal module 226 can query a database, e.g., a graph database or other databases (held, e.g., locally or on a data-storage system 124), for next hops matching the terms 308. Queries can be conducted locally or, e.g., via RESTful or other APIs discussed herein. In some examples, traversal module 226 can retrieve data of some or all next hops from the present node, then test each next hop to determine which next hops satisfy the term (s) 308. In some examples, edges or (edge, node) tuples can be associated with direction information, e.g., in an associative array or other data store. Traversal module 226 can retrieve the direction information, e.g., as "info [node_id, edge_id].direction".

In testing a next hop, traversal module 226 can test edge condition (s) 312 or node condition (s) 314, e.g., as determined or indicated by the corresponding atomic symbols or associated data. For example, given the edge condition ⟦ foo ⟧, traversal module 226 can retrieve an edge-type value of an outgoing edge and determine that that outgoing edge satisfies the edge condition if the edge-type value is "foo." In another example, given the node condition ⟦ [ifn=~"eegg.exe"] ⟧, traversal module 226 can determine an outgoing edge and a node to which that outgoing edge leads. Traversal module 226 can then retrieve an image filename (ifn) value associated with that node. Traversal module 226 can then determine that that node satisfies the node condition, or that the outgoing edge and node (which form a next hop) together satisfy the node condition, if the retrieved ifn value is "eegg.exe".

In some examples, traversal module 226 can test some or all next hops against the first atomic symbol before testing any next hops against a second atomic symbol. For example, at node 330 and state 320, traversal module 226 can test the next hops along each "child" edge against atomic symbol A before testing either next hop against atomic symbol B. This can permit pruning non-matches earlier, reducing the computational load of running the query. In some examples, traversal module 226 can test each outgoing edge against the conditions for each matching atomic symbol in order that the atomic symbols appear in the query 408 or in the parsed query from operation 506.

In some examples, at operation 510, traversal module 226 can traverse a first transition of the DFA 238 from the present state. The first transition can be conditioned on the corresponding first symbol of the atomic symbols, i.e., the symbol representing conditions satisfied by the first outgoing edge. For example, traversal module 226 can traverse transition "A" from state 320 back to state 320. Traversing a transition of a DFA 238 can include updating a pointer or state variable associated with the DFA 238 and with the query 114 to indicate that the state of the DFA 238 is now the state for which the transition is an incoming transition.

In some examples, at operation 512, traversal module 226 can traverse the outgoing edge of the present node of the graph 112. For example, traversal module 226 can traverse the "child" edge from node 330 to node 332. Traversing an edge of a graph 112 can include updating a pointer or state variable associated with the graph 112 and with the query 114 to indicate that the present node of the graph 112 is now the node for which the edge is an incoming edge. In some examples, traversing can include retrieving, e.g., via local access or an API query, information associated with the new present node of the graph 112 or outgoing edges thereof.

In some examples discussed above, traversal module 226 traverses a transition of the DFA 238 and an edge of the graph 112 upon determining that a next hop satisfies any edge condition (s) 312 or node condition (s) 314 that are applicable. In other examples, traversal module 226 traverses a first transition of the DFA 238 from a first state to a second state, and a first edge of the graph 112 from a first node to a second node, upon determining that the first edge satisfies any edge condition (s) 312 that are applicable.

Traversal module 226 then tests any node condition (s) 314 that are applicable upon reaching the second node via the first edge. If the second node fails to satisfy at least one node condition 314, traversal module 226 can unwind back to the first node and the first state, and continue traversing. Either of these styles of testing node conditions 314 can be used with any of the examples described herein, unless otherwise expressly indicated. Various orders of testing edge condition (s) 312, testing node condition (s) 314, traversing transitions, and traversing edges can be used to determine a next hop, in some examples.

348. Examples are discussed herein, e.g., with reference to FIG. 8.

Continuing the example of FIG. 3, traversal for the job (node 330)→⟦ child* child module [ifn=~'*.exe', :ret] ⟧ can proceed as given in Table 2. In Table 2, "x/y" represents node x, state y. "New" refers to nodes or edges that have not yet been visited during the traversal with respect to a transition being tested. For brevity, the traversal shown in Table 2 is conducted disregarding the edges to node 352 (shown dotted in FIG. 3). In DFA 304, state 320 is an initial state, state 324 is a terminal state, and state 324 is also a triggering state.

TABLE 2

| Present Node | Present State | Outgoing Edge | Outgoing Transition |
|---|---|---|---|
| 330 | 320 | Left child | A |
| 332 | 320 | None: no outgoing edge matches transition A or B. Unwind back to 330/320. | |
| 330 | 320 | Right child | A |
| 334 | 320 | Child | A |
| 340 | 320 | None: no outgoing edge matches transition A or B. Unwind back to 334/320. | |
| 334 | 320 | Child | B |
| 340 | 322 | Module | C |
| 342 | 324 | (*A) Test node condition 314. IFN "bach.exe"=~'*.exe', so carry out action 318 (retrieve data "bach.exe"). No outgoing edges (terminal state). Unwind back to 340/322. Terminal state, and node condition satisfied, so record an indication that the query has succeeded. | |
| 340 | 322 | None: no remaining out edges. Unwind back to 334/320. | |
| 334 | 320 | None: no new outgoing edge matches transition A or B. Unwind to 330/320 | |
| 330 | 320 | Left child | B |
| 332 | 322 | Module | C |
| 336 | 324 | Test node condition 314. IFN "floyd.so" !~'*.exe', so produce no results. No outgoing edges (terminal state). Unwind back to 332/322 | |
| 332 | 322 | None: all outgoing edges have been tested against all conditions. Unwind back to 330/320. | |
| 330 | 320 | Right child | B |
| 334 | 322 | Module | C |
| 338 | 324 | (*B) Test node condition 314. IFN "oldfield.exe"=~'*.exe', so carry out action 318 (retrieve data "oldfield.exe"). No outgoing edges (terminal state). Unwind back to 334/322. | |
| 334 | 322 | None: no new outgoing edges. Unwind back to 330/320. | |
| 330 | 320 | None: all transitions out of state 320 at node 330 have been tested. Since that is the case, and node 330 is the entry-point node 348, traversal is complete. | |

As noted above, operations 508-512 can be repeated to traverse the DFA 238 in conjunction with the graph 112. Upon reaching a node, actions 318 associated with the term 308 by which that node was reached can be carried out. After reaching a terminal state of the DFA 238 and performing processing at that terminal state, traversal can be unwound, as described herein with reference to FIG. 6. Unwinding generally returns the search to a prior state and node. That node can have at least two outgoing edges to test, so one can be tested before unwinding and one after. Unwinding permits exploring a tree, which a DFA on its own cannot do in the general case. This is because a DFA does not have a stack.

In some examples, a query succeeds if, upon reaching a terminal state of the DFA 238 and a corresponding node of the graph 112, the corresponding node satisfies node condition 314 (e.g., predicate (s) 316 therein). Success of a query can indicate that the query 114 matches the graph 112 (or at least a portion thereof) with respect to the entry-point node 348. Unwinding can permit a query to succeed with respect to more than one node from a given entry-point node In Table 2, the marks "(*A)" and "(*B)" indicate rows (state/stack/node combinations) in which, or with respect to which, operation 420 is carried out. In some examples, at least one of row (*A) or row (*B) includes providing data (operation 424). In some examples, each of row (*A) and row (*B) includes retrieving data (operation 420), but not providing data. In some of these examples, operation 424 is carried out after traversal is complete. Examples are discussed herein, e.g., with reference to FIG. 8.

In some examples, at operation 514, parsing module 224 can determine, based on the query, an edge reference associated with the triggering state. For example, in the query ⟦ child[:ret username] ⟧, "username" can be the edge reference. The DFA corresponding with this query can have two states and one transition, conditioned on a "child" edge. The edge reference can be associated with the state to which that transition leads. The edge reference can indicate or refer to data that is not present at a node or edge, but that should be returned as if it were. For example, in some examples of FIG. 3, process nodes 330, 332, 334, and 340 do not have a "username" field. However, session node 352 does have data 354 of a username. Operations 514, 516, and 518 can permit retrieving data 354 as if it were present at a process node 330, 332, 334, or 340.

In some examples, at operation 516, traversal module 226 can determine a sub-result edge of the graph originating from the result node and corresponding to the edge reference. Continuing the example of the previous paragraph, if the result node is node 332, the sub-result edge can be the dotted edge from node 332 to session node 352.

In some examples, at operation 518, retrieval module 228 can retrieve, e.g., from the computer memory, sub-result data 520 associated with at least one of the sub-result edge or a sub-result node at which the sub-result edge terminates. In some examples, the sub-result edge is a dangling edge, and the sub-result data 520 is associated with the edge. Continuing the example of the preceding paragraph, the sub-result data 520 can include at least some of the data 354. At operation 518, the retrieval module 228 can retrieve the data 354 from session node 352 and include the data 354 in the sub-result data 520.

In some examples, at operation 518, retrieval module 228 can retrieve at least a portion of the sub-result data 520 by querying a datasource. For example, retrieval module 228 can retrieve the sub-result data 520 from a data source, e.g., a database or remote computing system, communicatively connected with the control unit. An example of such a computing system can be a computing device 102 or other computing system connected with the control unit via a network 108. In some examples, operation 518 is performed on computing device 102 (1) and the data source is operated by computing device 102 (2). The retrieval module 228 can provide data of the sub-result edge or sub-result node to the data source, and receive information to be included in the data source. For example, the retrieval module 228 can query VIRUSTOTAL or another third-party database, and include data provided by VIRUSTOTAL in the sub-result data 520. In some examples, data from VIRUSTOTAL can be specified via edge references such as "vt.name". Such data can be included in structured output data 240, e.g., JSON output, as fields such as "hits.vt.name" or "hits.vt_name".

In some examples, at operation 522, communications module 222 can provide the sub-result data 520 in association with, e.g., as part of, the data 422 via the communications interface 232. Continuing the example of the previous paragraph, this can permit returning a username using the simpler query 〚child[:ret username]〛 instead of the more lengthy query 〚child session [:ret username]〛. The "username" field can be made accessible via a process node 332 rather than a session node 352. In this way, "username" becomes a "virtual field" of process node 332, while remaining an actual field of session node 352. Virtual fields can additionally or alternatively be used in predicates 316. For example, the query (init)→〚child [username=~'RVW', :ret]〛 will retrieve all children of the init process (e.g., init (8)) linked with sessions having the username "RVW".

In some examples, virtual fields may be exposed in the QL syntax using edge references having a record-like notation, e.g., 〚child [session.username=~'RVW']〛 as shorthand for 〚child session [username=~'RVW']〛. Such an edge reference can be of the form "prefix fieldname" in some examples. The prefix can indicated, e.g., a node, an edge, or a datasource. This can permit processing queries such as, e.g., 〚[:ret (ifn, session.username)] primary_module [:ret vt.positives]〛. The output data 240 for this example query, run with an entry-point node pointing to a process, can include the image filename and the session's username data 354. The output data 240 can also include the VIRUSTOTAL count of positives for the primary module associated with that process. Using edge references with prefixes can permit readily assembling data from a variety of data sources, which can in turn permit more readily analyzing system components to locate malware or mitigate malicious activities.

In some examples, at operation 514, parsing module 224 can locate a "prefix fieldname" edge reference in the query 114. During traversal, e.g., at operation 516, the traversal module 226 can determine that a prefix in the edge reference does not exist as a named field in the result node. The traversal module 226 can then locate an outgoing (from the result node) edge that has a type or other identifier matching the prefix, e.g., a "session" edge to node 352 or a "user" edge. That outgoing edge can be the sub-result edge. The traversal module 226 can then locate the fieldname on the sub-result edge or the sub-result node at which the sub-result edge terminates. The traversal module 226 or the retrieval module 228 can then include in the output data 240 the value associated with the fieldname. In some examples, at least one of the prefix or the fieldname is unique with respect to the nodes being searched. In some examples, each process node has exactly one "user" edge leading to a "user" node that contains a "username" field. Therefore, 〚parent[:ret user.username]〛 will return a "user.username" property as if it were a property of the parent process node.

Providing virtual fields can permit reducing the complexity of queries or making commonly-retrieved information more readily available. Providing virtual fields can additionally or alternatively permit returning a common set of fields or virtual fields with respect to nodes of more than one type. This can permit providing the results in tabular form, since the result for each node can have the same fields regardless of type. Tabular results can include, e.g., a row per node and a column per virtual field, or that arrangement transposed.

In some examples, at operation 524, parsing module 224 can determine, e.g., based on the query 114, a bounding state of the DFA and an edge count associated with the bounding state. For example, parsing module 224 can parse the query to determine the edge count expressed in the query 114. In some examples, a system-startup process such as init (8) may have dozens or hundreds of children, represented by "child" outgoing edges from the node representing the system-startup process in the graph 112. To reduce the resource consumption of a query, an edge count may be defined that will limit the number of edges traversed from the bounding state and a particular node. The edge count can be retrieved from a per-system or per-user configuration file, in some examples. Additionally or alternatively, the edge count can be parsed from the query. In some examples, multiple candidate edge counts can be determined, e.g., from a configuration file or from the query, and the lowest of those can be selected as the edge count. For example, the query 〚child〛 can have an edge count of 42.

In some examples using operation 524, as part of carrying out the traversing, traversal module 226 can perform operations 526 and 528.

In some examples, at operation 526, traversal module 226 can reach the bounding state of the DFA and a corresponding bounding node of the graph. For example, the query 〚child<42〛 can correspond to the regex /A/ and the resulting DFA S1–A→S2. The bounding state can be state S2. The bounding node can be any node of the graph reached in association with a transition into the bounding state.

In some examples, at operation 528, traversal module 226 can traverse a number of edges from the bounding node that is at most the edge count. Operation 528 can include at least one of operations 414, 420, or 424, or operations described herein as part of any of those. For example, at operation 528, traversal module 226 can continue normal traversal, but stop after the number of outgoing edges traversed from the bounding node reaches the edge count. At that point, traversal can unwind or terminate, as described herein.

Figure 6:
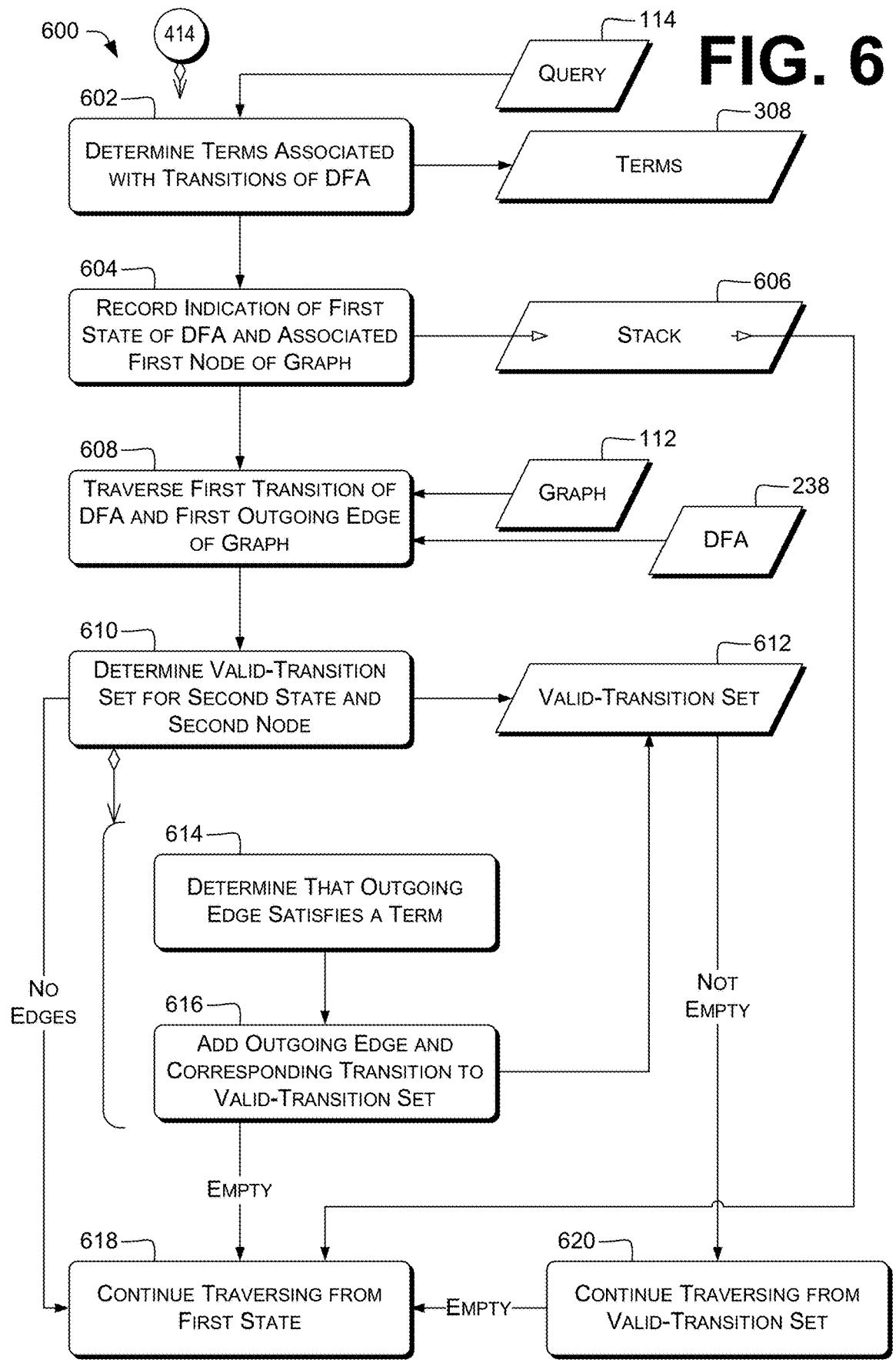
FIG. 6 is a dataflow diagram that illustrates example processes for unwinding DFAs while searching graphs according to various examples described herein.

FIG. 6 is a dataflow diagram that illustrates an example process 600 for searching graph (s), and example data items. Process 600 shows example techniques for performing unwinding, e.g., as referenced in Table 2. In some examples, process 600, or other processes or operations for traversing as described herein, can include traversing a DFA 238 using a non-backtracking DFA engine, e.g., in or controlled by traversal module 226. When the non-backtracking DFA engine terminates traversal, either with a successful match or with a failure to match, unwinding can be performed. Unwinding can include retrieving a previous state of the DFA from a stack or other storage data structure. Traversal of the DFA can then be resumed from the previous state. Using a non-backtracking DFA engine can permit controlling unwinding based on query semantics and graph structure. Using a non-backtracking DFA engine can also permit the DFA traversal to be carried out in a deterministic amount of time, improving the time efficiency of running queries.

In some examples, at operation 602, parsing module 224 can determine one or more terms 308 associated with respective transitions of the one or more transitions of the DFA. For example, parsing module 224 can determine the terms 308 by parsing the query 114 as described above.

In some examples, traversal module 226 can carry out the traversing (operation 414) at least partly by performing operations 604-618.

In some examples, at operation 604, traversal module 226 can record an indication of a first state of the DFA 238 and an associated first node of the graph. For example, traversal module 226 can push the indication on a stack 606 that is separate from the DFA 238, as represented by the hollow-headed arrow from operation 604 to stack 606.

In some examples, at operation 608, traversal module 226 can traverse a first outgoing transition from the first state and a corresponding first outgoing edge from the first node. In this way, traversal module 226 can determine a second state of the DFA 238 and a second node of the graph 112. The second node can be different from the first node, even if the second state is the same as the first state. The second state can be the same as the first state, e.g., for a query such as ⟦parent * ⟧, or for transition A in DFA 304, FIG. 3. Alternatively, the second state may be a different state from the first state, e.g., as in a query such as ⟦parent child⟧.

In some examples, at operation 610, traversal module 226 can determine, for the second state and the second node, a valid-transition set 612. As used herein, a "set" can be empty or can have any number of elements. Traversal module 226 can, e.g., perform operations 614 and 616 for at least one second outgoing edge of the second node. In some examples, if there are no outgoing edges from the second node, traversal module 226 can determine that the valid-transition set is empty, and proceed with operation 618 ("no edges").

In some examples, at operation 614, traversal module 226 can determine whether the second outgoing edge under consideration satisfies a term 308 (e.g., at least one term 308) of the one or more terms 308 determined at operation 602. Examples are discussed herein, e.g., with reference to FIG. 3 and Table 2. The term can be associated with at least one outgoing transition from the second state of the DFA 238. Bounding as described herein with reference to operations 524-528 can additionally or alternatively be applied at operation 614. For example, if as many edges as, or more edges than, the bound have been traversed, traversal module 226 can determine that the second outgoing edge does not satisfy the term. If the second outgoing edge does satisfy the term, the next operation can be operation 616.

In some examples, at operation 616, traversal module 226 can add that second outgoing edge, and the at least one outgoing transition determined at operation 614, to the valid-transition set 612. This can be done in response to the outgoing edge satisfying the term 308, as determined at operation 614.

In some examples, at operation 618, in response to the valid-transition set 612 being empty (e.g., no edge found that satisfies a term; marked "empty"), traversal module 226 can continue the traversing from the first state and the first node. For example, traversal module 226 can pop the state and node from the stack 606, as indicated by the hollow-headed arrow out of stack 606. The traversal module 226 can continue the traversing using (e.g., via) a third outgoing edge different from the first outgoing edge. This is an example of unwinding, as described herein. Operation 618 can additionally or alternatively be carried out in response to the present node having no outgoing edges, or in response to none of the outgoing edges satisfying any of the transitions from the present state.

In some examples, at operation 620, in response to the valid-transition set 612 comprising at least one transition ("Not empty"), traversal module 226 can continue the traversing from the at least one transition. In this way, traversal can continue, e.g., using operations 604 and 608, until the DFA can no longer proceed. At that point, operation 620 can be followed by operation 618 to unwind and continue along a different branch of the graph.

Unwinding during traversal, e.g., using operations 602-620, can permit searching a graph without requiring the user to learn syntax for specifying the search path through the graph. A linear query, e.g., ⟦child child [:ret]⟧, can be expanded by the traversal module 226 to return not just the node at the end of the first ⟦child child⟧ path encountered in the search, but some or all such paths originating from the entry-point node 348. This can reduce the workload of users of the search service, and thus mitigate bandwidth consumption that might otherwise occur as users corrected mis-specified queries. Using unwinding can also permit using a non-backtracking DFA engine, since resuming traversal upon DFA match failure can be handled by operation 618 rather than by the DFA engine. Some backtracking DFA engines have exponential time complexity for pathological inputs. Therefore, using unwinding as described herein together with a non-backtracking DFA engine can permit executing multiple, different queries in a more consistent time period than if one query might take orders of magnitude longer than others.

Figure 7:
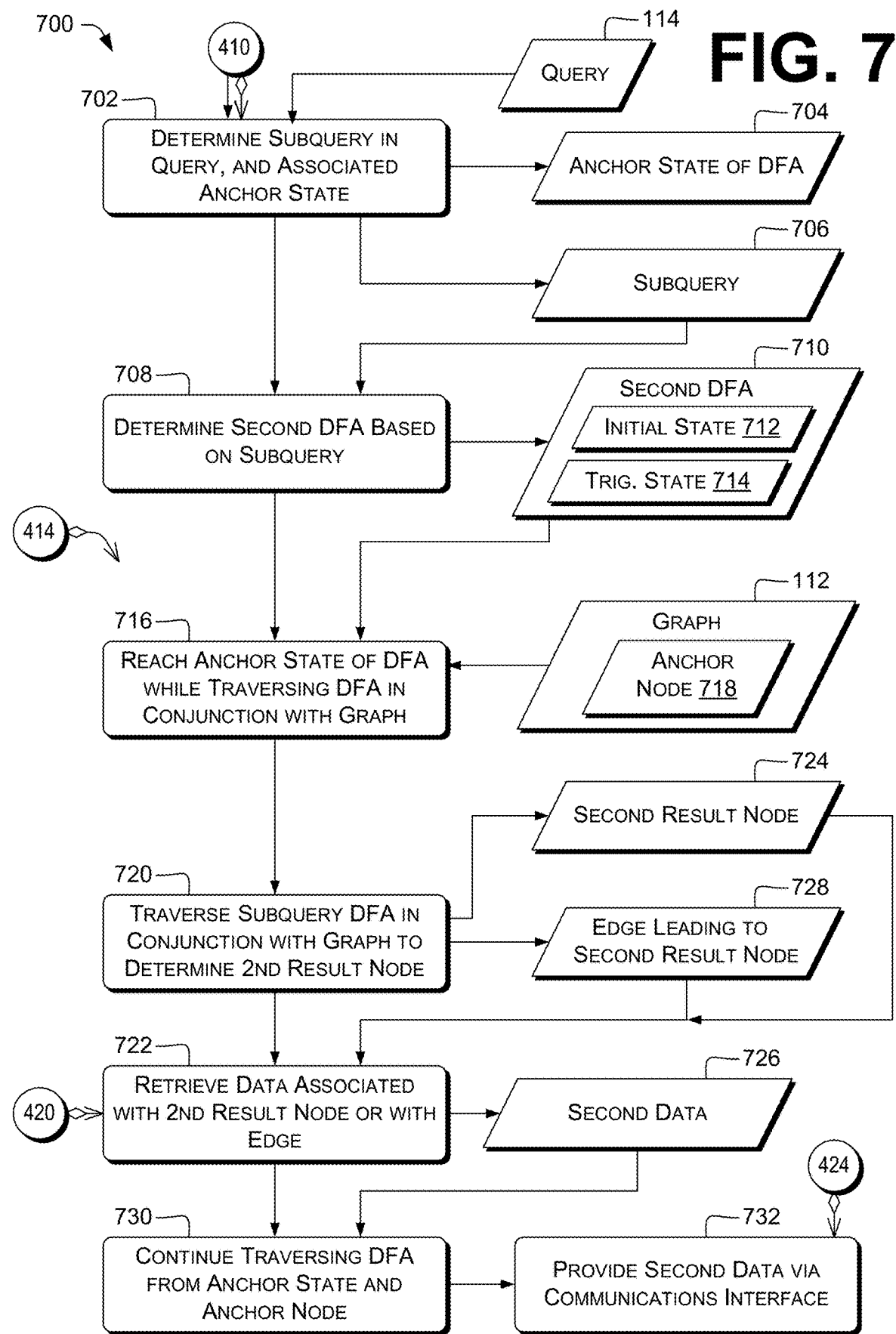
FIG. 7 is a dataflow diagram that illustrates example processes for processing subqueries while searching graphs, according to various examples described herein.

FIG. 7 is a dataflow diagram that illustrates an example process 700 for searching graph (s), and example data items. In some examples, process 700 permits processing subqueries that add results to the data 422 provided as a result of the search. In some examples, subqueries are optional, and do not affect the success or failure of the query in which they are contained. In some examples, subqueries are required, and the query fails if a required subquery fails. In some examples, a query includes zero or more optional subqueries and zero or more required subqueries.

For example, the query ⟦:include (parent parent [:ret]) child child [:ret]⟧ returns the grandparent node of the entry-point node 348 (⟦parent parent [:ret]⟧), and any grandchild nodes of the entry-point node 348 (⟦child child [:ret]⟧). If the entry-point node 348 does not have a grandparent node, that is, the subquery ⟦parent parent⟧ fails, the query as a whole continues, since the subquery was marked as optional by the command ⟦:include⟧.

In another example, the query ⟦:require (parent parent [:ret]) child child [:ret]⟧ returns the grandparent node of the entry-point node 348, and any grandchild nodes of the entry-point node 348, provided the entry-point node 348 has a grandparent node. The command ⟦:require⟧ marks a subquery as required, so failure of the subquery (⟦parent parent [:ret]⟧) will cause the full query to terminate with a failure indication.

In some examples, at operation 702, parsing module 224 can determine, e.g., in or based on the query 114, an anchor state 704 of the DFA 412, and a subquery 706. The subquery 706 can be associated with the anchor state 704. For example, parsing module 224 can locate, in the query 114, text matching the pseudo-BNF grammar rule "(':include'|':require') '('<query>')'", where "<query>" is a nonterminal matching a query 114. In some examples, a subquery can include further nested subqueries, e.g., ⟦:include (parent :include (child))⟧. In other examples, a subquery is prohibited from including nested subqueries.

In some examples, at operation 708, parsing module 224 can determine a second DFA 710 associated with the subquery, the second DFA having a second initial state 712 and a second triggering state 714. Examples are discussed herein, e.g., with reference to operation 410. For example, atomic-symbol conversion and regex compilation as discussed herein with reference to operations 502-506 can be used with respect to the text of the subquery. Operation 708 can be performed at the time of producing the DFA for the query 114 (operation 410), or subsequently thereto.

In some examples, traversal module 226 can perform the traversing (operation 414) at least partly by performing operations 716-730.

In some examples, at operation 716, traversal module 226 can reach the anchor state 704 of the DFA 412 and a corresponding anchor node 718 of the graph 112. In some examples, traversal module 226 can record an indication of the anchor state 704 and the anchor node 718. For example, traversal module 226 can push the indication on a stack 606, as described herein with reference to FIG. 6.

In some examples, at operation 720, traversal module 226 can traverse the second DFA 710 in conjunction with the graph 112, beginning at the anchor state 704 and the corresponding anchor node 718. Examples are discussed herein, e.g., with reference to operation 414. In some examples, the second DFA 710 can be traversed in the same way as the DFA 238.

In some examples, at operation 722, retrieval module 228 can, during the traversing of the second DFA 710, reach the second triggering state 714 and an associated second result node 724 of the graph 112. In response, retrieval module 228 can retrieve, from the computer memory, second data 726 associated with at least one of: the second result node 724, or an edge 728 of the graph 112 connected with the second result node 724 and via which the second result node 724 was reached during the traversing of the second DFA 710.

In some examples, at operation 730, traversal module 226 can, after traversing the second DFA 710, continue the traversing of the DFA 412 from the anchor state 704 of the DFA 412 and the anchor node 718 of the graph 112. For example, traversal module 226 can pop the saved indication off stack 606, as described herein with reference to FIG. 6.

In some examples, at operation 732, communications module 222 can provide the second data 726 via the communications interface 232. For example, the second data 726 can be included in, appended to, or otherwise provided with data 422.

Figure 8:
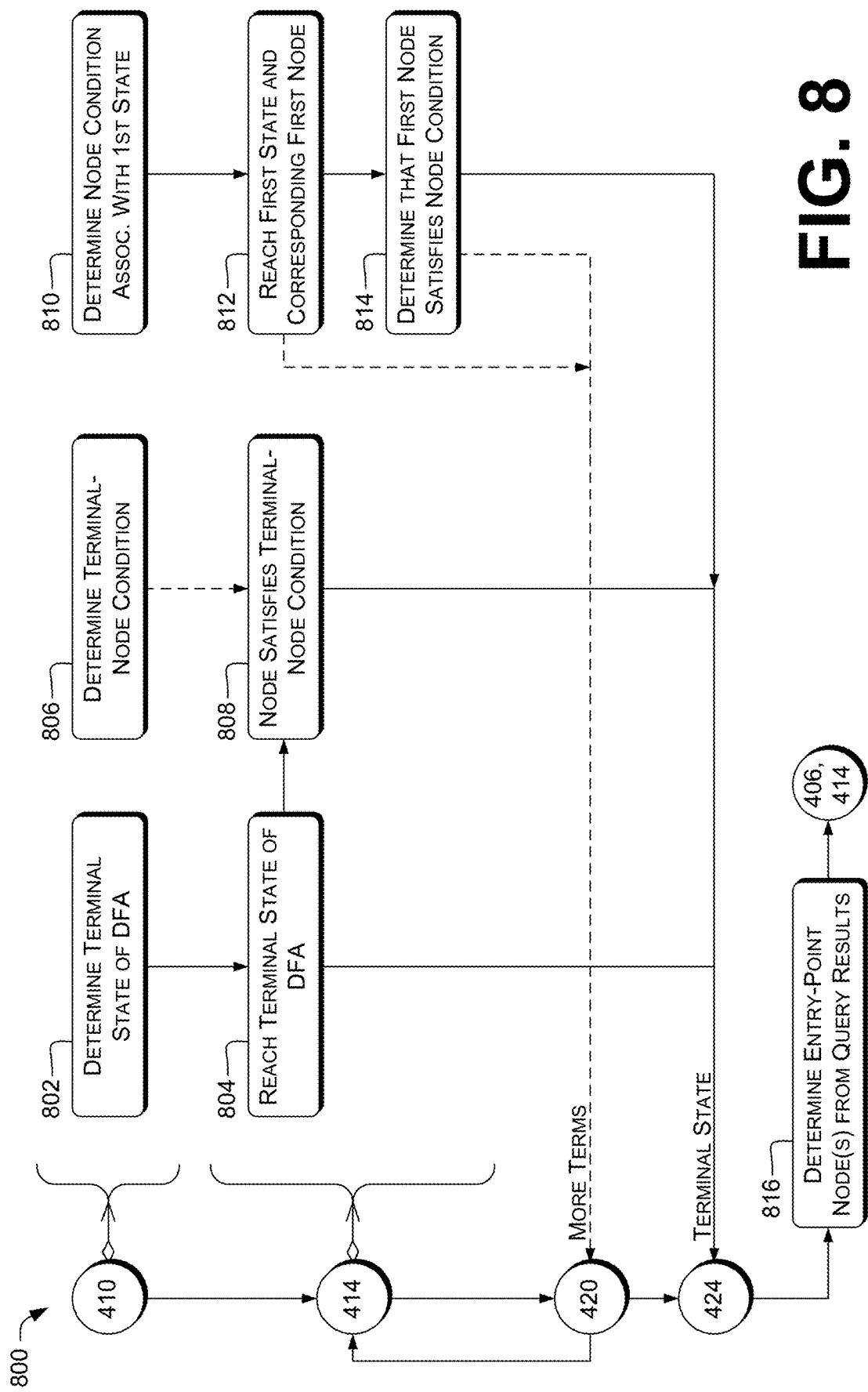
FIG. 8 is a flow diagram that illustrates example processes for searching graphs according to various examples described herein.

FIG. 8 is a dataflow diagram that illustrates an example process 800 for searching graph(s), and example data items. In some examples, process 800 permits providing results in a way conditioned on the overall success of a query 114, and in some examples specifically on the success of a job. For example, in the query ⟦[:ret] parent * parent [ifn=~"browser.exe"]⟧, the ⟦[:ret]⟧ action is first, corresponding to the entry-point node. This query can return results, in some examples of process 800, only if the entry-point node has a parent that is "browser.exe", e.g., a Web browser. This query can be applied separately to each process of one or more processes (e.g., as separate jobs running sequentially or in parallel), and will provide results indicating which of those processes are children of a "browser.exe" process. Those results can then be used as entry-point nodes for other jobs.

In some examples, operation 420 or operation 424 (shown) can be followed by operation 816. In some examples, operation 816 can be followed by operation 406 or operation 414.

In some examples, any or all of operations 802-814 can be performed prior to operation 424 of providing the result data via the communications interface 232. In some examples, operation 424 can be performed in response to a determination of query or job success at any of operations 804, 808, or 814. Various examples of process 800, accordingly, can permit reporting results only upon success of a query 114 or a corresponding job. For example, operation 420 can determine data 422 and add the data 422 to a queue (or other result-data structure). Data 422 can then be provided (operation 424) via the communications interface 232 from the queue in response to a determination of query success at any of operations 804, 808, or 814.

In some examples, at operation 802, the parsing module 224 can determine the one or more states of the DFA comprising a terminal state 358 of the DFA. For example, the parsing module 224 can determine that the state associated with the rightmost term in the query 114 is the terminal state 358. As discussed above, in FIG. 3, state 324 is a terminal state 358. In the example query above, the terminal state 358 is a state in which the condition ⟦[ifn=~"browser.exe"]⟧ can be tested.

In some examples, at operation 804, the traversal module 226 can carry out the traversing at least partly by reaching the terminal state 358 of the DFA and a corresponding first node of the graph. Examples are discussed herein, e.g., with reference to operation 414 or FIG. 6. In some examples, e.g., of queries in which the final term 308 does not include a predicate 316, and thus always succeeds, reaching the terminal state 358 of the DFA can indicate that the query has succeeded.

In some examples, e.g., the query above, the terminal state 358 is associated with a predicate 316. In some of those examples, operation 410 can also include operation 806, and operation 414 can also include operation 808. This can permit reporting results when the terminal node satisfies a condition on the terminal node indicated by the query 114.

In some examples, at operation 806, the parsing module 224 can determine a node condition 314 (e.g., a predicate 316) associated with the terminal state of the DFA based at least in part on the query. Examples are discussed herein, e.g., with reference to operations 410 or 502 or Table 1.

In some examples, at operation 808, the traversal module 226 can determine that the first node of the graph ("Node") satisfies the node condition ("Terminal-Node Condition"). Examples are discussed herein, e.g., with reference to FIG. 3, e.g., term 308, node condition 314, or result nodes 350, to Table 2, or to operation 508. Operation 808 uses the node condition 314 determined at operation 806, as indicated by the dashed arrow. In some examples, determining that the first node satisfies the node condition can indicate that the query 114 has succeeded.

Node conditions can be associated with states other than the terminal state 358. In some examples, at operation 810, the parsing module 224 can determine, based at least in part on the query 114, a node condition 314 associated with a first state of the one or more states of the DFA 238. The first state can be the terminal state 358 or a different state, e.g., an initial state 326, a triggering state 328, or another state. Examples of determining a node condition 314 are discussed herein, e.g., with reference to traversal module 226, terms 308, or operations 414, 502, 508, 516, 610, or 614.

In some examples, at operation 812, the traversal module 226 can reach the first state and a corresponding first node of the graph. Examples are discussed herein, e.g., with reference to operation 414 and FIGS. 5-7. For example, the first state can be the triggering state and the first node can be the result node.

In some examples, at operation 814, the traversal module 226 can determine that the first node of the graph satisfies the node condition. Examples are discussed herein, e.g., with reference to traversal module 226, terms 308, edge conditions 312, node conditions 314, or operations 414, 508, 516, 610, or 614. In some examples, determining that the first node satisfies the node condition can indicate that the query has succeeded.

In some examples, operation 812 or operation 814 can be followed by operation 420 ("more terms"; dashed lines). In some examples, operation 804, operation 808, or operation 814 can be followed by operation 424 ("terminal state"; solid lines). In some examples, operation 420 can be followed by operation 414. For example, traversal of a DFA 238 having multiple triggering states can be performed by traversing to the first triggering state (operation 414 or 812); retrieving data associated with the corresponding result node (operation 420); traversing from the corresponding node to the next triggering state (operation 414); retrieving data associated with that triggering state's corresponding result node (operation 420); and so on as long as there are terms 308 left to process in the query 114. Once the terminal state is reached (operation 804 or 812), and a condition is tested if specified in query 114 (operation 808 or 814), the assembled (e.g., queued) results from operation (s) 420 can be provided via the communications interface (operation 424). This can permit determining success or failure of a query independently of the specific data reported upon success of that query.

In some examples, at operation 816, the control unit, e.g., running communications module 222 or another module, can determine at least one second entry-point node based at least in part on the results of a query or job, e.g., on output data 240, data 356, data 422, sub-result data 520, second data 726, or other job-result data described herein. For example, operation 406 can include successively receiving two queries, and node (s) identified in the results of the first query can be used as the entry-point node (s) for the second query. In some examples, operation 424 can include presenting search results of a query via a user interface, and operation 816 can include receiving, via the user interface, a selection of node (s) of the search results to be used as entry-point node (s) of a subsequent query. Using operation 816 can permit a user to more effectively refine a query or sequence of queries to locate specific malware or system components associated with malware. In some examples, operation 816 can additionally include receiving the second query, e.g., via a user interface 202.

Operation 816 can be followed by operation 406, to process a new query, or operation 414, to repeat the existing query, in either case with respect to the determined second entry-point node from operation 816. In some examples, operation 414 can include traversing the DFA in conjunction with the graph, beginning at the initial state and the second entry-point node.

In some examples, operation 406 can include receiving a second query, e.g., as discussed above for the query. In some examples, operation 410 can include producing a second DFA based on the query, wherein the second DFA comprises one or more second states; the second DFA comprises one or more second transitions connecting at least some of the second states; the one or more second states comprise a second initial state; and the one or more second states comprise a second triggering state. In some examples, operation 414 can include traversing the second DFA in conjunction with the graph, beginning at the second initial state and the second entry-point node, to reach a second result node of the graph, the second result node associated with the second triggering state. In some examples, operation 420 can include retrieving, from the computer memory, data associated with at least one of: the second result node, or a second edge of the edges of the graph connected with the second result node and via which the second result node was reached during the traversing. In some examples, operation 424 can include providing the second data via the communications interface. Examples of all of the operations listed in this paragraph are discussed herein at least with reference to FIG. 4. In some examples, each query 114 can be processed independently using a common set of operations, e.g., those shown in FIG. 4.

Figure 9:
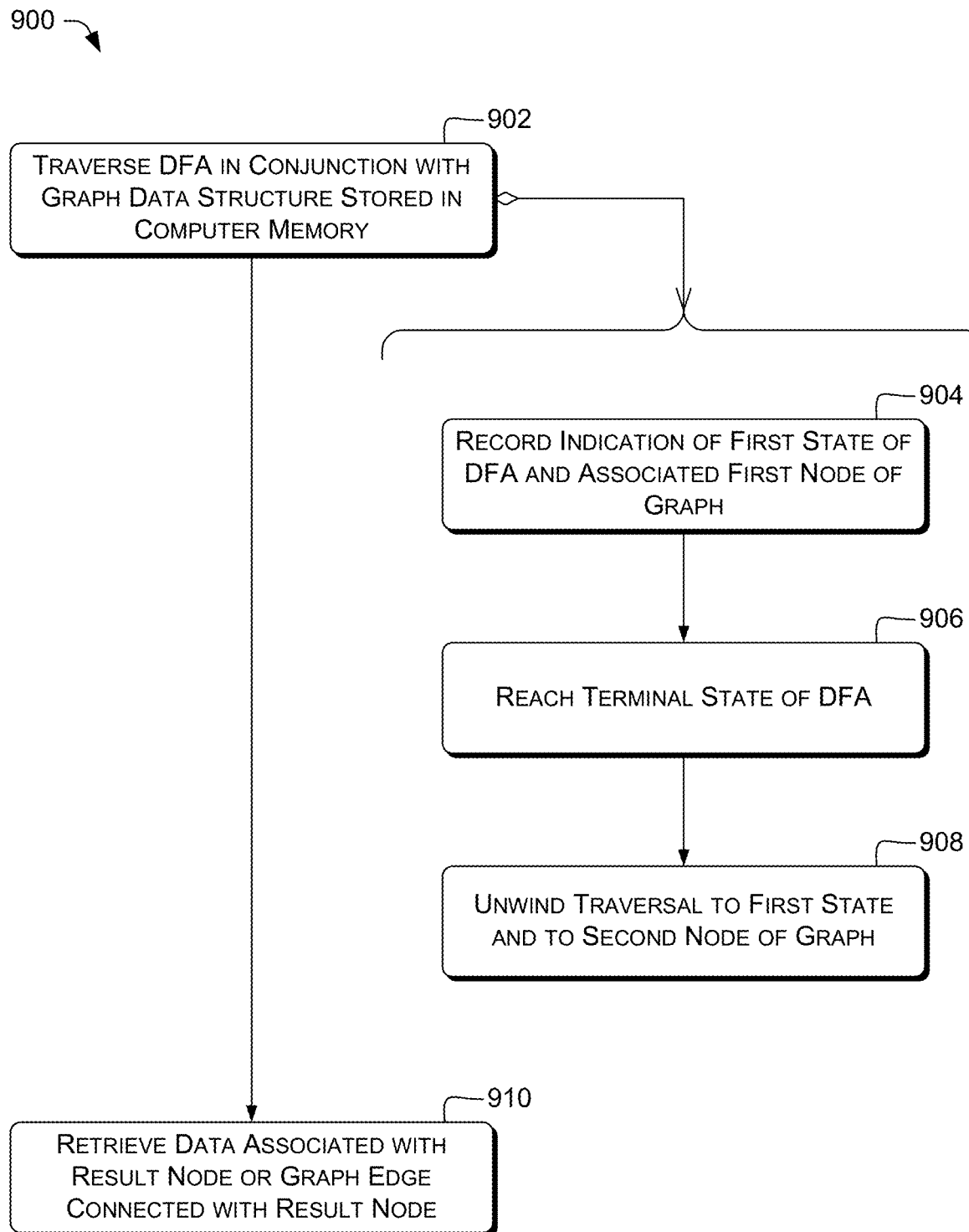
FIG. 9 is a flow diagram that illustrates example processes for traversing a discrete finite automaton in conjunction with a graph, including unwinding during traversal, according to various examples described herein.

FIG. 9 is a flow diagram that illustrates an example process 900 for retrieving data, e.g., by searching graph (s) such as graphs 112, 220, or 306. Process 900 can be carried out, e.g., by a data-retrieval system 122 having a computer-readable memory (e.g., memory 212 or CRM 214) and a control unit. The control unit can carry out operations described herein, e.g., by executing instructions or logic of modules 222, 224, 226, 228, or 230.

In some examples, at operation 902, the control unit can traverse a discrete finite automaton (DFA) 238 in conjunction with a graph data structure (e.g., graph 112) stored in the computer memory. Traversal can begin at an initial state 326 of the DFA 238 and an entry-point node 348 of the graph 112. Traversal can be performed to reach a result node 350 associated with a triggering state 328 of the DFA 238. Examples are discussed herein, e.g., with reference to FIGS. 2-8, e.g., operation 414. In the illustrated example, the traversing includes operations 904-908.

In some examples, at operation 904, the control unit can record an indication of a first state of the DFA and an associated first node of the graph data structure. For example, the control unit can push the indication on a stack. Examples are discussed herein, e.g., with reference to operation 604.

In some examples, at operation 906, the control unit can reach a terminal state 358 of the DFA 238. Examples are discussed herein, e.g., with reference to operations 616, 618, or 804, FIG. 5, or Table 2.

In some examples, at operation 908, e.g., in response to reaching the terminal state 358, the control unit can unwind the traversal to the first state and a second node of the graph 112 different from the first node. Examples are discussed herein, e.g., with reference to operation 618, FIG. 5 or 8, or Table 2.

In some examples, at operation 910, the control unit can retrieve data associated with at least one of the result node 350 or an edge of the graph 112 connected with the result node 350. Examples are discussed herein, e.g., with reference to operations 420, 518, or 722. In some examples, the edge of the graph 112 can be an incoming edge to the result node 350 or an outgoing edge from the result node 350. In some examples, the edge of the graph 112 can be a dangling edge. In some examples, operation 910 can be performed in response to or as part of operation 906, or before or after operation 908.

In some examples, prior to operation 902, the control unit can retrieve query data via a communications interface 232. Examples are discussed herein, e.g., with reference to communications module 222, query 302, or operations 406 or 702. In some examples, the query data can include text of a query 114, e.g., expressed in a QL such as those described herein. In other examples, the query data can include a DFA 238 representing a query 114. For example, the query data can include binary data representing states, transitions, node conditions, and edge conditions. Examples are discussed herein, e.g., with reference to DFA 304, operations 410, 502-506, 514, 524, 602, or 702.

In some examples, the control unit can determine the DFA 238 based at least in part on the query data. When the query data includes a textual query, the control unit can carry out operation 410. When the query data includes data of the DFA 238, the control unit can load or unpack that data into memory, or otherwise prepare the DFA 238 for execution.

In some examples, after operation 910, the control unit can provide the data via a communications interface 232. Examples are discussed herein, e.g., with reference to communications module 222, output data 240, operations 424 or 522, or FIG. 8.

In some examples, as part of or during the traversing (operation 902), the control unit can reach a condition-bearing state of the DFA in conjunction with a candidate node of the graph data structure. The candidate node can be any node, and node conditions can be tested against any node. Examples are discussed herein, e.g., with reference to node condition 314, operation 610, valid-transition set 612, operations 614 or 812, FIG. 8, or Table 2.

In some examples, the control unit can determine that the candidate node satisfies a node condition associated with the condition-bearing state. Examples are discussed herein, e.g., with reference to operations 614, 812, or 814, or Table 2.

In some examples, in response to the determination that the candidate node satisfies the node condition, the control unit can continue the traversing of the DFA via at least one outgoing edge of the candidate node and a corresponding outgoing edge of the condition-bearing state. Examples are discussed herein, e.g., with reference to operations 616, 620, or 814, FIG. 3, 5, or 8, or Table 2.

In some examples, as part of or during the traversing (operation 902), the control unit can reach a bounding state of the DFA associated with an edge count. Examples are discussed herein, e.g., with reference to operations 524, 526, or 614.

In some examples, having reached the bounding state, the control unit can traverse a number of edges from the bounding node that is at most the edge count. Examples are discussed herein, e.g., with reference to operation 528.

In some examples, as part of or during the traversing (operation 902), the control unit can reach a first state of the DFA 238 and a corresponding first node of the graph 112.

In some examples, the control unit can determine that an association between the first state and the first node is not indicated in a visit-record data structure. That is, this particular node has not been visited in this state for the present job. The visit-record data structure can include, e.g., an array mapping a state and a node to a Boolean value. Such an array can be a two-dimensional array or a one-dimensional array indexed by 2-tuples, in some examples. Examples are discussed herein, e.g., with reference to FIG. 5 and Table 2. In some examples, the visit-record data structure is initialized to empty, or all False, at the beginning of each job.

In some examples, the control unit can record an indication of the association between the first state and the first node in the visit-record data structure. For example, the Boolean value can be set to True for this combination of first state and first node. Examples are discussed herein, e.g., with reference to FIG. 5 and Table 2.

In some examples, the control unit can traverse an outgoing edge of the DFA from the first state in associated with an outgoing edge of the first node of the graph data structure. This can be done, e.g., in response to having determined that the association between the first state and the first node was not previously indicated in the visit-record structure, as discussed two paragraphs above. Examples are discussed herein, e.g., with reference to FIG. 5 and Table 2.

Figure 10:
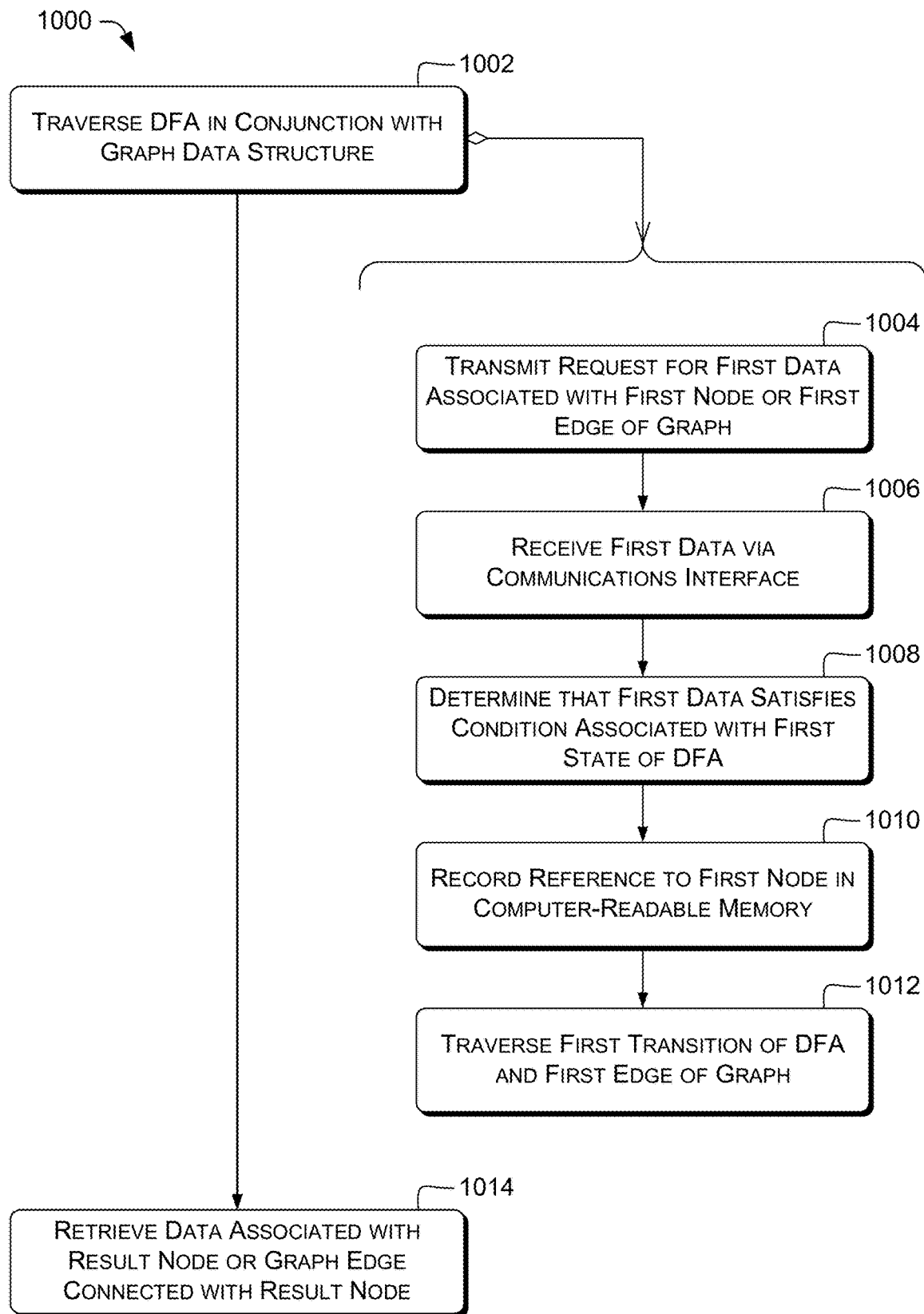
FIG. 10 is a flow diagram that illustrates example processes for traversing a discrete finite automaton in conjunction with a graph, including receiving data of the graph via a communications interface such as a network interface, according to various examples described herein.

FIG. 10 is a flow diagram that illustrates an example process 1000 for retrieving data, e.g., by searching graph (s) such as graphs 112, 220, or 306. Process 1000 can be carried out, e.g., by a system, e.g., a data-retrieval system 122 or other computing device 102, having a computer-readable memory (e.g., memory 212 or CRM 214), a communications interface 232, and a control unit. The control unit can carry out operations described herein, e.g., by executing instructions or logic of modules 222, 224, 226, or 228. In some examples, process 1000 can be used to perform searches using a data-retrieval system 122 separated from a data-storage system 124, as discussed herein with reference to FIG. 1.

In some examples, at operation 1002, the control unit can traverse a discrete finite automaton (DFA) 238 in conjunction with the graph 112, beginning at an initial state 326 of the DFA 238 and an entry-point node 348 of the graph 112, to reach a result node 350 associated with a triggering state 328 of the DFA 238. Operation 1002 can include operations 1004-1012. In some examples, the control unit can receive query data via communications interface 232 and determining the DFA based at least in part on the query data. Examples are discussed herein, e.g., with reference to FIG. 9.

In some examples, at operation 1004, the control unit can transmit, via the communications interface 232 (e.g., a network interface), a request for first data associated with at least one of a first node or a first edge of the graph 112. For example, the request can be an HTTP request (e.g., "GET /node/1") or other API request sent, e.g., via interprocess communications (IPC), a network, or other technologies described herein with reference to communications interface 232. Examples are discussed herein, e.g., with reference to network (s) 108, data-retrieval system 122, data-storage system 124, communications module 222, or operations 402, 508, or 512.

In some examples, at operation 1006, e.g., subsequent to operation 1004, the control unit can receive, via the communications interface 232 (e.g., a network interface), the first data. For example, the first data can include at least one of: the value of a field of or associated with the first node, or an indication of an edge connected to the first node and the direction of the connection. In some examples, the first data can include at least one of: the value of a field of or associated with the first edge, or an indication of a node connected to the first edge and the direction of the connection. Examples are discussed herein, e.g., with reference to network (s) 108, data-retrieval system 122, data-storage system 124, communications module 222, or operations 402, 508, or 512.

In some examples, at operation 1008, the control unit can determine that the first data satisfies a condition associated with a first state of the DFA. Examples are discussed herein, e.g., with reference to operations 614, 812, or 814, FIG. 9, or Table 2.

In some examples, at operation 1010, the control unit can record a reference to the first node in the computer-readable memory. This can later permit unwinding to the first node, e.g., as discussed herein with reference to FIG. 6. The reference can include, e.g., a database key or node identifier, or a proxy object representing the first node or pointer to such a proxy object. Examples of recording references are described herein with reference to FIG. 4 or 5, or operations 604 or 904.

In some examples, at operation 1012, the control unit can traverse a first transition of the DFA 238 and the first edge of the graph 112. Examples are discussed herein, e.g., with reference to operations 414, 510, 512, 528, 608, 814, or 902.

In some examples, at operation 1014, the control unit can retrieve data associated with at least one of the result node 350 or an edge of the graph 112 connected with the result node 350, e.g., an incoming edge, outgoing edge, or dangling edge. Examples are discussed herein, e.g., with reference to operations 420, 518, 722, or 910. In some examples, operation 1014 can be performed before or after operation 1012.

In some examples, after traversing the first transition (operation 1012), the control unit can reach a terminal state 358 of the DFA 238. Examples are discussed herein, e.g., with reference to operations 616, 618, 804, or 906, FIG. 5, or Table 2.

In some examples, e.g., in response to reaching the terminal state 358, the control unit can unwind the query. For example, the control unit can retrieve the reference to the first node from the computer-readable memory. The reference is described herein with reference to operation 1010. The control unit can then retrieve, e.g., from RAM or via an API request to a data-storage system 124, an indication of a second edge out of the first node. The second edge can be different from the first edge discussed above with reference to operation 1004, 1006, or 1012.

The control unit can then transmit, via the communications interface 232, a request for second data associated with the second edge. Examples are discussed herein, e.g., with reference to operation 1004. The control unit can subsequently receive, via the communications interface 232, the second data. Examples are discussed herein, e.g., with reference to operation 1006. The control unit can then traverse a second transition of the DFA 238 and the second edge of the graph 112. Examples of this traversal, and of unwinding, are discussed herein, e.g., with reference to operations 618 or 908, FIG. 5 or 8, or Table 2.

In some examples of unwinding and other processes herein, retrieving the indication of the second edge as noted above can include transmitting, via the communications interface 232, a request for edge information. The request can indicate the first node (e.g., via the "1" in request "GET /node/1/outgoing_edges"). After transmitting this request, the control unit can receive, via the communications interface 232, an indication of the second edge.

In some examples, requested data may become unavailable. For example, as described herein with reference to communications module 222 and updating module 230, stale information may occasionally or regularly be removed from the graph 112. Therefore, in some examples, between the time when the control unit receives the indication of the second edge and the time when the control units requests second data regarding the second edge (or similar situations with respect to any target node, edge, or other data of graph 112), the second edge (or other target) may be removed from graph 112. Moreover, in some examples, communications between the data-retrieval system 122 and the data-storage system 124 may be interrupted or impaired, e.g., by congestion or link failure. In some examples, the data-retrieval system 122 can unwind rather than failing in the presence of some faults.

In some examples, accordingly, the control unit can transmit, via the communications interface, a request for second data associated with at least one of a second node or a second edge of the graph 112. The control unit can subsequently receive, via the communications interface 232, an indication that the second data is not available. The indication can be, e.g., an HTTP 4xx (e.g., HTTP 404) response code, a timeout, a network failure, or another error, unavailability indication, or empty response. In response, the control unit can retrieve the reference to the first node from the computer-readable memory, as described above. The control unit can retrieve an indication of a second edge out of the first node, e.g., from cached information or responses to an earlier request. The control unit can then traverse a transition of the DFA and the second edge of the graph data structure. Examples of unwinding are discussed above, e.g., with respect to FIGS. 5, 9, and 10.

Example Clauses

Various examples include one or more of, including any combination of any number of, the following example features. Throughout these clauses, parenthetical remarks are for example and explanation, and are not limiting. Parenthetical remarks given in this Example Clauses section with respect to specific language apply to corresponding language throughout this section, unless otherwise indicated.

A: A method of retrieving data from a graph data structure in a computer memory, the method comprising, by a control unit: receiving an indication of an entry-point node of the graph data structure, the graph data structure comprising nodes and edges connecting at least some of the nodes; receiving a query; producing a discrete finite automaton (DFA) based on the query, wherein: the DFA comprises one or more states; the DFA comprises one or more transitions connecting at least some of the states; the one or more states comprise an initial state; and the one or more states comprise a triggering state; traversing the DFA in conjunction with the graph data structure, beginning at the initial state and the entry-point node, to reach a result node of the graph data structure, the result node associated with the triggering state; retrieving, from the computer memory, data associated with at least one of: the result node, or an edge of the edges of the graph data structure connected with the result node and via which the result node was reached during the traversing; and providing the data via a communications interface.

B: The method according to paragraph A, further comprising, by the control unit: receiving the query via the communications interface on a channel communicatively connected with a user interface; and providing the data via the communications interface on the channel communicatively connected with the user interface.

C: The method according to paragraph A, further comprising, by the control unit: determining at least two terms in the query; determining at least two atomic symbols, wherein each atomic symbol is associated with a respective term of the at least two terms; producing the DFA having at least some of the one or more transitions conditioned on respective symbols of the at least two atomic symbols; and carrying out the traversing at least partly by repeatedly: determining, for a present node of the graph data structure and a present state of the DFA, a first symbol of the atomic symbols corresponding to a first outgoing edge of the present node; traversing a first transition of the DFA from the present state, the first transition conditioned on the first symbol; and traversing the outgoing edge of the graph data structure.

D: The method according to paragraph C, further comprising carrying out the traversing at least partly by, testing at least one outgoing edge at the present node against the conditions for each matching atomic symbol in the order that the atomic symbols appear in the query or the parsed query.

E: The method according to paragraph A, further comprising, by the control unit: determining a subquery in the query, the subquery associated with an anchor state of the DFA; determining a second DFA associated with the sub query, wherein: the second DFA comprises one or more states; the one or more states comprise a second initial state; and the one or more states comprise a second triggering state; carrying out the traversing at least partly by: reaching the anchor state of the DFA and a corresponding anchor node of the graph data structure; traversing the second DFA in conjunction with the graph data structure, beginning at the anchor state and the corresponding anchor node; during the traversing of the second DFA, upon reaching the second triggering state and an associated second result node of the graph data structure, retrieving, from the computer memory, second data associated with at least one of: the second result node, or an edge of the graph data structure connected with the second result node and via which the second result node was reached during the traversing of the second DFA; and after traversing the second DFA, continuing the traversing of the DFA from the anchor state of the DFA and the anchor node of the graph data structure; and providing the second data via the communications interface.

F: The method according to paragraph A, further comprising, by the control unit: determining, based on the query, an edge reference associated with the triggering state; determining a sub-result edge of the graph data structure originating from the result node and corresponding to the edge reference; retrieving sub-result data associated with at least one of the sub-result edge or a sub-result node at which the sub-result edge terminates; and providing the sub-result data in association with the data via the communications interface.

G: The method according to paragraph F, wherein the retrieving the second data comprises at least one of: retrieving the sub-result data from the computer memory; or retrieving the sub-result data from a data source communicatively connected with the control unit.

H: The method according to paragraph A, further comprising, by the control unit: determining a bounding state of the DFA and an edge count associated with the bounding state; and carrying out the traversing at least partly by at least: reaching the bounding state of the DFA and a corresponding bounding node of the graph data structure; traversing a number of edges from the bounding node that is at most the edge count.

I: The method according to paragraph H, further comprising parsing the query to determine the edge count expressed in the query.

J: The method according to paragraph A, further comprising, by the control unit: determining one or more terms associated with respective transitions of the one or more transitions of the DFA; and carrying out the traversing at least partly by: recording an indication of a first state of the DFA and an associated first node of the graph data structure; traversing a first outgoing transition from the first state and a corresponding first outgoing edge from the first node to determine a second state of the DFA and a second node of the graph data structure, wherein the second node is different from the first node; determining, for the second state and the second node, a valid-transition set by, for at least one second outgoing edge of the second node: determining whether that second outgoing edge satisfies a term of the one or more terms, the term associated with at least one outgoing transition from the second state of the DFA; and if so, adding that second outgoing edge and the at least one outgoing transition to the valid-transition set; and in response to the valid-transition set being empty: continuing the traversing from the first state and the first node using a third outgoing edge different from the first outgoing edge.

K: The method according to paragraph J, further comprising, in response to the valid-transition set comprising at least one transition, continuing the traversing from the at least one transition.

L: The method according to paragraph A, further comprising, by the control unit, prior to the providing the data via the communications interface: determining the one or more states of the DFA comprising a terminal state of the DFA; and carrying out the traversing at least partly by reaching the terminal state of the DFA and a corresponding first node of the graph data structure.

M: The method according to paragraph L, further comprising, by the control unit, prior to the providing the data via the communications interface: determining a node condition associated with the terminal state of the DFA based at least in part on the query; and determining that the first node of the graph data structure satisfies the node condition.

N: The method according to paragraph A, further comprising, by the control unit: determining, based at least in part on the query, a node condition associated with a first state of the one or more states; and carrying out the traversing at least partly by: reaching the first state and a corresponding first node of the graph data structure; and determining that the first node of the graph data structure satisfies the node condition.

O: The method according to paragraph N, wherein the first state is the triggering state and the first node is the result node.

P: The method according to paragraph A, further comprising, by the control unit: determining a second entry-point node based at least in part on the data; receiving a second query; producing a second DFA based on the query, wherein: the second DFA comprises one or more second states; the second DFA comprises one or more second transitions connecting at least some of the second states; the one or more second states comprise a second initial state; and the one or more second states comprise a second triggering state; traversing the second DFA in conjunction with the graph data structure, beginning at the second initial state and the second entry-point node, to reach a second result node of the graph data structure, the second result node associated with the second triggering state; retrieving, from the computer memory, data associated with at least one of: the second result node, or a second edge of the edges of the graph data structure connected with the second result node and via which the second result node was reached during the traversing; and providing the second data via the communications interface.

Q: The method according to paragraph A, further comprising, before producing the DFA, determining that the query does not include a required action (e.g., 〚[:ret]〛); and in response, adding at least one default action to the query.

R: The method according to paragraph A, further comprising, by the control unit, determining a second entry-point node based at least in part on the data.

S: A data-retrieval system, comprising: a computer-readable memory; and a control unit configured to perform operations comprising: traversing a discrete finite automaton (DFA) in conjunction with a graph data structure stored in the computer memory, beginning at an initial state of the DFA and an entry-point node of the graph data structure, to reach a result node associated with a triggering state of the DFA, wherein the traversing comprises: recording an indication of a first state of the DFA and an associated first node of the graph data structure; reaching a terminal state of the DFA; and in response, unwinding the traversal to the first state and a second node of the graph data structure different from the first node; and retrieving data associated with at least one of the result node or an edge of the graph data structure connected with the result node.

T: The data-retrieval system according to paragraph S, the operations further comprising: retrieving query data via a communications interface; determining the DFA based at least in part on the query data; and providing the data via a communications interface.

U: The data-retrieval system according to paragraph S, the operations further comprising, during the traversing: reaching a condition-bearing state of the DFA in conjunction with a candidate node of the graph data structure; determining that the candidate node satisfies a node condition associated with the condition-bearing state; and in response, continuing the traversing of the DFA via at least one outgoing edge of the candidate node and a corresponding outgoing edge of the condition-bearing state.

V: The data-retrieval system according to paragraph S, the operations further comprising, during the traversing: reaching a bounding state of the DFA associated with an edge count; and traversing a number of edges from the bounding node that is at most the edge count.

W: The data-retrieval system according to paragraph S, the operations further comprising, during the traversing: reaching a first state of the DFA and a corresponding first node of the graph data structure; determining that an association between the first state and the first node is not indicated in a visit-record data structure; recording an indication of the association between the first state and the first node in the visit-record data structure; and traversing an outgoing edge of the DFA from the first state in associated with an outgoing edge of the first node of the graph data structure.

X: A system comprising: a communications interface; a computer-readable memory; and a control unit configured to perform operations comprising: traversing a discrete finite automaton (DFA) in conjunction with the graph data structure, beginning at an initial state of the DFA and an entry-point node of the graph data structure, to reach a result node associated with a triggering state of the DFA, wherein the traversing comprises: transmitting, via the communications interface, a request for first data associated with at least one of a first node or a first edge of the graph data structure; subsequently, receiving, via the communications interface, the first data; determining that the first data satisfies a condition associated with a first state of the DFA; recording a reference to the first node in the computer-readable memory; and traversing a first transition of the DFA and the first edge of the graph data structure; and retrieving data associated with at least one of the result node or an edge of the graph data structure connected with the result node.

Y: The system according to paragraph X, the operations further comprising: after traversing the first transition, reaching a terminal state of the DFA; retrieving the reference to the first node from the computer-readable memory; retrieving an indication of a second edge out of the first node; transmitting, via the communications interface, a request for second data associated with the second edge; subsequently, receiving, via the communications interface, the second data; and traversing a second transition of the DFA and the second edge of the graph data structure.

Z: The system according to paragraph Y, the operations for retrieving the indication of the second edge further comprising: transmitting, via the communications interface, a request for edge information, the request indicating the first node; and receiving, via the communications interface, an indication of the second edge.

AA: The system according to paragraph X, the operations for traversing further comprising: transmitting, via the communications interface, a request for second data associated with at least one of a second node or a second edge of the graph data structure; subsequently, receiving, via the communications interface, an indication that the second data is not available; in response, retrieving the reference to the first node from the computer-readable memory; retrieving an indication of a second edge out of the first node; and traversing a transition of the DFA and the second edge of the graph data structure.

AB: The system according to paragraph X, further comprising: receiving query data via a communications interface; and determining the DFA based at least in part on the query data.

AC: As in any of paragraphs A, S, or X, wherein the traversing is carried out at least in part by traversing the DFA using a non-backtracking DFA engine.

AD: As in any of paragraphs A, T, or AB, wherein the query (or query data) does not contain a Kleene star.

AE: A computer-readable medium, e.g., a computer storage medium, having thereon computer-executable instructions, the computer-executable instructions upon execution configuring a computer to perform operations as any of paragraphs A-R, S-W, X-AB, AC, or AD recites.

AF: A device comprising: a processor; and a computer-readable medium, e.g., a computer storage medium, having thereon computer-executable instructions, the computer-executable instructions upon execution by the processor configuring the device to perform operations as any of paragraphs A-R, S-W, X-AB, AC, or AD recites.

AG: A system comprising: means for processing; and means for storing having thereon computer-executable instructions, the computer-executable instructions including means to configure the system to carry out a method as any of paragraphs A-R, S-W, X-AB, AC, or AD recites.

Conclusion

Various techniques described herein can permit more efficiently searching graphs, including graphs on very large scales (e.g., tens of thousands of nodes, hundreds of thousands of nodes, millions of nodes, or at least ten million nodes, in various nonlimiting examples). Various examples can efficiently filter based on both relationships between nodes and conditions applied to those nodes, unlike prior schemes that filter based on only one of those two. Various examples can reduce the time or memory requirements of software to search graphs. Various examples can reduce the network bandwidth required to provide search results, e.g., by including fields from multiple nodes as virtual fields of a single node. Some examples permit retrieving signatures, behavioral data, or other information that can then be used by neural networks or other classifiers in determining classifications of unknown files. Some examples are described with reference to malware, but techniques described herein are not limited to files associated with malware. For example, techniques used herein can be used to retrieve data associated with, e.g., media files (e.g., audio, video, or image); productivity files (e.g., text documents or spreadsheets); data files (e.g., database indexes or tables); or other types of files.

The word "or" and the phrase "and/or" are used herein in an inclusive sense unless specifically stated otherwise. Accordingly, conjunctive language such as, but not limited to, at least one of the phrases "X, Y, or Z," "at least X, Y, or Z," "at least one of X, Y or Z," "one or more of X, Y, or Z," and/or any of those phrases with "and/or" substituted for "or," unless specifically stated otherwise, is to be understood as signifying that an item, term, etc. can be either X, or Y, or Z, or a combination of any elements thereof (e.g., a combination of XY, XZ, YZ, and/or XYZ). Any use herein of phrases such as "X, or Y, or both" or "X, or Y, or combinations thereof" is for clarity of explanation and does not imply that language such as "X or Y" excludes the possibility of both X and Y, unless such exclusion is expressly stated.

As used herein, language such as "one or more Xs" shall be considered synonymous with "at least one X" unless otherwise expressly specified. Any recitation of "one or more Xs" signifies that the described steps, operations, structures, or other features may, e.g., include, or be performed with respect to, exactly one X, or a plurality of Xs, in various examples, and that the described subject matter operates regardless of the number of Xs present, as long as that number is greater than or equal to one.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Although some features and examples herein have been described in language specific to structural features and/or methodological steps, it is to be understood that the appended claims are not necessarily limited to the specific features or steps described herein. Rather, the specific features and steps are disclosed as preferred forms of implementing the claimed invention. For example, computing devices 102 or 104, network 108, processing unit (s) 210, or other structures described herein for which multiple types of implementing devices or structures are listed can include any of the listed types, and/or multiples and/or combinations thereof.

Moreover, this disclosure is inclusive of combinations of the aspects described herein. References to "a particular aspect" (or "embodiment" or "version") and the like refer to features that are present in at least one aspect of the invention. Separate references to "an aspect" (or "embodiment") or "particular aspects" or the like do not necessarily refer to the same aspect or aspects; however, such aspects are not mutually exclusive, unless so indicated or as are readily apparent to one of skill in the art. The use of singular or plural in referring to "method" or "methods" and the like is not limiting.

It should be emphasized that many variations and modifications can be made to the above-described examples, the elements of which are to be understood as being among other acceptable examples. All such modifications and variations are intended to be included herein within the scope of this disclosure and protected by the following claims. Moreover, in the claims, any reference to a group of items provided by a preceding claim clause is a reference to at least some of the items in the group of items, unless specifically stated otherwise. This document expressly envisions alternatives with respect to each and every one of the following claims individually, in any of which claims any such reference refers to each and every one of the items in the corresponding group of items. Furthermore, in the claims, unless otherwise explicitly specified, an operation described as being "based on" a recited item can be performed based on only that item, or based at least in part on that item. This document expressly envisions alternatives with respect to each and every one of the following claims individually, in any of which claims any "based on" language refers to the recited item (s), and no other (s).

Some operations of example processes or devices herein are illustrated in individual blocks and logical flows thereof, and are summarized with reference to those blocks. The order in which the operations are described is not intended to be construed as a limitation unless otherwise indicated. Any number of the described operations can be executed in any order, combined in any order, subdivided into multiple sub-operations, or executed in parallel to implement the described processes. For example, in alternative implementations included within the scope of the examples described herein, elements or functions can be deleted, or executed out of order from that shown or discussed, including substantially synchronously or in reverse order. In some examples, combinations of the described functions can be performed in batch, in a streamed or pipelined manner, or in any combination of batch, stream, and pipelined processing.

Each illustrated block can represent one or more operations that can be implemented in hardware, software, or a combination thereof. In the context of software, the operations described herein represent computer-executable instructions stored on at least one computer-readable medium (e.g., computer storage medium) that, when executed by one or more processors, cause or enable the one or more processors to perform the recited operations. Generally, computer-executable instructions include routines, programs, objects, modules, code segments, components, data structures, and the like that perform particular functions or implement particular abstract data types.

Accordingly, the methods, processes, or operations described above can be embodied in, and fully automated via, software code modules executed by one or more computers or processors. As used herein, the term "module" is intended to represent example divisions of the described operations (e.g., implemented in software or hardware) for purposes of discussion, and is not intended to represent any type of requirement or required method, manner or organization. Therefore, while various "modules" are discussed herein, their functionality and/or similar functionality can be arranged differently (e.g., combined into a smaller number of modules, broken into a larger number of modules, etc.). In some instances, the functionality and/or modules discussed herein may be implemented as part of a computer operating system (OS) 216. In other instances, the functionality and/or modules may be implemented as part of a device driver, firmware, application, or other software subsystem.

Example computer-implemented operations described herein can additionally or alternatively be embodied in specialized computer hardware. For example, various aspects herein may take the form of an entirely hardware aspect, an entirely software aspect (including firmware, resident software, micro-code, etc.), or an aspect combining software and hardware aspects. These aspects can all generally be referred to herein as a "service," "circuit," "circuitry," "module," or "system." The described processes can be performed by resources associated with one or more computing device (s) 102, 104, and/or 200, such as one or more internal or external CPUs or GPUs, or one or more pieces of hardware logic such as FPGAs, DSPs, or other types of accelerators.

What is claimed is:

1. A method of retrieving data from a graph data structure in a computer memory, the method comprising, by a control unit:
   receiving an indication of an entry-point node of the graph data structure, the graph data structure comprising nodes and edges connecting at least some of the nodes;
   receiving a query, wherein the query includes at least one unary operator indicating a pattern that includes a traversal condition for traversing the graph data structure;
   producing a discrete finite automaton (DFA) based on the query, wherein:
      the DFA comprises one or more states;
      the DFA comprises one or more transitions connecting at least some of the states;
      the one or more states comprise an initial state; and
      the one or more states comprise a triggering state;
   traversing the DFA in conjunction with the graph data structure, beginning at the initial state and the entry-point node, to reach a result node of the graph data structure, the result node associated with the triggering state;
   retrieving, from the computer memory, data associated with at least one of:
      the result node, or
      an edge of the edges of the graph data structure connected with the result node and via which the result node was reached during the traversing;
   providing the data via a communications interface;
   determining a second entry-point node based at least in part on the data;
   receiving a second query;
   producing a second DFA based on the query, wherein:
      the second DFA comprises one or more second states;
      the second DFA comprises one or more second transitions connecting at least some of the second states;
      the one or more second states comprise a second initial state; and
      the one or more second states comprise a second triggering state;
   traversing the second DFA in conjunction with the graph data structure, beginning at the second initial state and the second entry-point node, to reach a second result node of the graph data structure, the second result node associated with the second triggering state:
   retrieving, from the computer memory, second data associated with at least one of:
      the second result node, or
      a second edge of the edges of the graph data structure connected with the second result node and via which the second result node was reached during the traversing; and
   providing the second data via the communications interface.

2. The method according to claim 1, further comprising, by the control unit:
   receiving the query via the communications interface on a channel communicatively connected with a user interface; and
   providing the data via the communications interface on the channel communicatively connected with the user interface.

3. The method according to claim 1, further comprising, by the control unit:
   determining at least two terms in the query;
   determining at least two atomic symbols, wherein each atomic symbol is associated with a respective term of the at least two terms;
   producing the DFA having at least some of the one or more transitions conditioned on respective symbols of the at least two atomic symbols; and
   carrying out the traversing at least partly by repeatedly:
      determining, for a present node of the graph data structure and a present state of the DFA, a first symbol of the atomic symbols corresponding to a first outgoing edge of the present node;
      traversing a first transition of the DFA from the present state, the first transition conditioned on the first symbol; and
      traversing the first outgoing edge of the graph data structure.

4. The method according to claim 1, further comprising, by the control unit:

determining a subquery in the query, the subquery associated with an anchor state of the DFA;
determining a third DFA associated with the subquery, wherein:
the third DFA comprises one or more states;
the one or more states comprise a third initial state; and
the one or more states comprise a third triggering state;
carrying out the traversing at least partly by:
reaching the anchor state of the DFA and a corresponding anchor node of the graph data structure;
traversing the third DFA in conjunction with the graph data structure, beginning at the anchor state and the corresponding anchor node;
during the traversing of the third DFA, upon reaching the third triggering state and an associated third result node of the graph data structure, retrieving, from the computer memory, third data associated with at least one of:
the third result node, or
an edge of the graph data structure connected with the third result node and via which the third result node was reached during the traversing of the third DFA; and
after traversing the third DFA, continuing the traversing of the DFA from the anchor state of the DFA and the anchor node of the graph data structure; and
providing the third data via the communications interface.

5. The method according to claim 1, further comprising, by the control unit:
determining, based on the query, an edge reference associated with the triggering state;
determining a sub-result edge of the graph data structure originating from the result node and corresponding to the edge reference;
retrieving sub-result data associated with at least one of the sub-result edge or a sub-result node at which the sub-result edge terminates; and
providing the sub-result data in association with the data via the communications interface.

6. The method according to claim 1, further comprising, by the control unit:
determining a bounding state of the DFA and an edge count associated with the bounding state; and
carrying out the traversing at least partly by at least:
reaching the bounding state of the DFA and a corresponding bounding node of the graph data structure; and
traversing a number of edges from the bounding node that is at most the edge count.

7. The method according to claim 1, further comprising, by the control unit:
determining one or more terms associated with respective transitions of the one or more transitions of the DFA; and
carrying out the traversing at least partly by:
recording an indication of a first state of the DFA and an associated first node of the graph data structure;
traversing a first outgoing transition from the first state and a corresponding first outgoing edge from the first node to determine a third state of the DFA and a third node of the graph data structure, wherein the third node is different from the first node;
determining, for the third state and the third node, a valid-transition set by, for at least one third outgoing edge of the third node:
determining whether that third outgoing edge satisfies a term of the one or more terms, the term associated with at least one outgoing transition from the third state of the DFA; and
if so, adding that third outgoing edge and the at least one outgoing transition to the valid-transition set; and
in response to the valid-transition set being empty:
continuing the traversing from the first state and the first node using a fourth outgoing edge different from the first outgoing edge.

8. The method according to claim 1, further comprising, by the control unit, prior to the providing the data via the communications interface:
determining the one or more states of the DFA comprising a terminal state of the DFA; and
carrying out the traversing at least partly by reaching the terminal state of the DFA and a corresponding first node of the graph data structure.

9. The method according to claim 8, further comprising, by the control unit, prior to the providing the data via the communications interface:
determining a node condition associated with the terminal state of the DFA based at least in part on the query; and
determining that the first node of the graph data structure satisfies the node condition.

10. The method according to claim 1, further comprising, by the control unit:
determining, based at least in part on the query, a node condition associated with a first state of the one or more states; and
carrying out the traversing at least partly by:
reaching the first state and a corresponding first node of the graph data structure; and
determining that the first node of the graph data structure satisfies the node condition.

11. A data-retrieval system, comprising:
a computer-readable memory; and
a control unit configured to perform operations comprising:
traversing a discrete finite automaton (DFA) in conjunction with a graph data structure stored in the computer-readable memory, beginning at an initial state of the DFA and an entry-point node of the graph data structure, to reach a result node associated with a triggering state of the DFA, wherein the traversing comprises:
recording an indication of a first state of the DFA and an associated first node of the graph data structure;
reaching a terminal state of the DFA; and
in response to reaching the terminal state of the DFA, unwinding the traversal to the first state and a second node of the graph data structure different from the first node; and
retrieving data associated with at least one of the result node or an edge of the graph data structure connected with the result node.

12. The data-retrieval system according to claim 11, the operations further comprising:
retrieving query data via a communications interface;
determining the DFA based at least in part on the query data; and
providing the data via a communications interface.

13. The data-retrieval system according to claim 11, the operations further comprising, during the traversing:
reaching a condition-bearing state of the DFA in conjunction with a candidate node of the graph data structure;
determining that the candidate node satisfies a node condition associated with the condition-bearing state; and
in response to determining that the candidate node satisfies the node condition, continuing the traversing of the DFA via at least one outgoing edge of the candidate node and a corresponding outgoing edge of the condition-bearing state.

14. The data-retrieval system according to claim 11, the operations further comprising, during the traversing:
reaching a bounding state of the DFA associated with an edge count; and
traversing a number of edges from a bounding node that is at most the edge count.

15. The data-retrieval system according to claim 11, the operations further comprising, during the traversing:
reaching a first state of the DFA and a corresponding first node of the graph data structure;
determining that an association between the first state and the first node is not indicated in a visit-record data structure;
recording an indication of the association between the first state and the first node in the visit-record data structure; and
traversing an outgoing edge of the DFA from the first state in associated with an outgoing edge of the first node of the graph data structure.

16. A system comprising:
a communications interface;
a computer-readable memory; and
a control unit configured to perform operations comprising:
traversing a discrete finite automaton (DFA) in conjunction with a graph data structure, beginning at an initial state of the DFA and an entry-point node of the graph data structure, to reach a result node associated with a triggering state of the DFA, wherein the traversing comprises:
transmitting, via the communications interface, a request for first data associated with at least one of a first node or a first edge of the graph data structure;
subsequently, receiving, via the communications interface, the first data;
determining that the first data satisfies a condition associated with a first state of the DFA;
recording a reference to the first node in the computer-readable memory; and
traversing a first transition of the DFA and the first edge of the graph data structure;
retrieving data associated with at least one of the result node or an edge of the graph data structure connected with the result node;
after traversing the first transition, reaching a terminal state of the DFA;
retrieving the reference to the first node from the computer-readable memory;
retrieving an indication of a second edge out of the first node; and
transmitting, via the communications interface, a request for second data associated with the second edge.

17. The system according to claim 16, the operations further comprising:
transmitting, via the communications interface, a request for second data associated with the second edge;
subsequently, receiving, via the communications interface, the second data; and
traversing a second transition of the DFA and the second edge of the graph data structure.

18. The system according to claim 17, the operations for retrieving the indication of the second edge further comprising:
transmitting, via the communications interface, a request for edge information, the request indicating the first node; and
receiving, via the communications interface, an indication of the second edge.

19. The system according to claim 16, the operations for traversing further comprising:
transmitting, via the communications interface, a request for the second data associated with at least one of a second node or the second edge of the graph data structure;
subsequently, receiving, via the communications interface, an indication that the second data is not available;
in response to receiving the indication that the second data is not available, retrieving the reference to the first node from the computer-readable memory;
retrieving an indication of a second edge out of the first node; and
traversing a transition of the DFA and the second edge of the graph data structure.

* * * * *